(12) United States Patent
De Bruyn et al.

(10) Patent No.: US 9,034,228 B2
(45) Date of Patent: May 19, 2015

(54) BINDER COMPOSITION AND METHOD FOR TREATING PARTICULATE MATERIAL

(75) Inventors: Henri Arnold De Bruyn, Murrayfield (ZA); Walter Wilhelm Focke, Pretoria (ZA)

(73) Assignee: Henri Arnold De Bruyn, Murrayfield Pretoria (ZA)

( * ) Notice: Subject to any disclaimer, the term of this patent is extended or adjusted under 35 U.S.C. 154(b) by 774 days.

(21) Appl. No.: 10/501,356

(22) PCT Filed: Jan. 14, 2003

(86) PCT No.: PCT/ZA03/00005
§ 371 (c)(1),
(2), (4) Date: Feb. 11, 2005

(87) PCT Pub. No.: WO03/060038
PCT Pub. Date: Jul. 24, 2003

(65) Prior Publication Data
US 2005/0127550 A1  Jun. 16, 2005

(30) Foreign Application Priority Data

Jan. 14, 2002 (ZA) ................................. 2002/0291
Apr. 3, 2002 (ZA) ................................. 2002/2582

(51) Int. Cl.
| | |
|---|---|
| B27N 3/00 | (2006.01) |
| C09K 17/14 | (2006.01) |
| C09K 17/28 | (2006.01) |
| C09K 17/40 | (2006.01) |
| C09K 17/48 | (2006.01) |

(52) U.S. Cl.
CPC ................. *C09K 17/48* (2013.01); *C09K 17/28* (2013.01); *C09K 17/40* (2013.01)

(58) Field of Classification Search
USPC ............... 264/109–128; 424/274; 524/27, 59; 106/900
See application file for complete search history.

(56) References Cited

U.S. PATENT DOCUMENTS

| | | | | |
|---|---|---|---|---|
| 4,376,088 | A | * | 3/1983 | Prather .......................... 264/109 |
| 4,597,928 | A | * | 7/1986 | Terentiev et al. ................ 264/87 |
| 4,886,854 | A | * | 12/1989 | Markessini et al. ............. 524/14 |
| 5,523,049 | A | * | 6/1996 | Terpstra et al. ................. 419/36 |

FOREIGN PATENT DOCUMENTS

WO  WO 00/40669  *  7/2000  ............. C09K 17/28

* cited by examiner

*Primary Examiner* — Jennifer Michener
*Assistant Examiner* — Magali P Slawski
(74) *Attorney, Agent, or Firm* — Scully, Scott, Murphy & Presser, P.C.

(57) ABSTRACT

In accordance with this invention a binder composition for treating particulate material to form a solid aggregate matrix is prepared by providing a urea formaldehyde precondensate; a polar solvent; additional urea; an acid or salt thereof, the acid or salt thereof being selected such as to render the pH of the binder composition to a value from 2.0 to 5.3; providing a sugar; providing a binding promoter for enhancing the binding between the binder composition and the particulate material; and mixing the above so as to form a binder composition. The binder composition is mixed with particulate material and allowed to set into a solid aggregate matrix over a period of longer than 30 minutes from being mixed with the said particulate material.

17 Claims, 15 Drawing Sheets

BINDER COMPOSITION AND METHOD FOR TREATING PARTICULATE MATERIAL

INTRODUCTION AND BACKGROUND TO THE INVENTION

This invention relates to a binder composition and method for treating particulate material, to a method of preparing such binder composition, and to particulate material treated by the said method and binder composition.

UK patent number 1,184,129 (hereinafter referred to as D1) discloses a method and an aqueous solution for treating soil to improve its compressive strength and resistance to water permeation. The aqueous solution is mixed with the soil by being sprayed or poured onto the soil. The aqueous solution comprises:
- a water-soluble urea-formaldehyde precondensate containing 0.2 to 6 percent unreacted formaldehyde based on the total weight of the said solution, the precondensate being present in the said solution in a concentration of 4 to 30% based on the total weight of said solution;
- a setting agent chosen from organic and inorganic acids and acid salts thereof in an amount of 0.5 to 40% based on the total weight of the said solution; and
- urea in an amount of 3 to 12 times the weight of the said unreacted formaldehyde.

The preferred pH range of this solution is between 1 and 12 and as the pH of the solution decreases the setting time also decreases. In order to prevent the mixed solution from escaping through the soil to be treated, the setting time is adjusted to be as short as possible.

As is well known to those skilled in the art, an amino resin comprising an amine and an aldehyde is formed by two reactions, an addition reaction and a condensation reaction. When urea and formaldehyde are used, the addition reaction, or hydroxymethylation, comprises addition of formaldehyde to the binding sites of the urea, and the extent of the hydroxymethylation depends on the urea to formaldehyde ratio. Urea has four binding sites located on the two amine groups, with each having two binding sites. Thus, a maximum of four molecules of formaldehyde can bind to the binding sites of urea. The condensation reaction only takes place in acidic conditions and thus the time needed for the complete condensation reaction to take place decreases as the pH decreases. Where the reactions take place in a relatively shorter time, shorter chain polymers will form which will give the amino resin a more crystalline texture.

A disadvantage of the known solution is that, since the setting time is adjusted to be as short as possible, the solution has to be mixed and applied to the soil to be treated in a relatively short amount of time, thus making it difficult to treat large areas such as roads. Relatively short polymeric chains are also formed in the rapid polymerisation reaction.

Another disadvantage of the aqueous solution is that it is not suitable for mixing with bulk soil, such as in excess of 20 tonnes and applying the mixture to a road surface in a layer over a period of a working day and thereafter compacting the layer, as the aqueous solution starts setting before the entire mixture has been applied to the road surface and compacted.

The result thereof is that the known aqueous solution is only suitable for spraying onto the road surface, with the accompanying disadvantage that the penetration of the solution into the road surface is limited. The known solution therefore seals the top surface of the road, but does not stabilise the substrate.

UK patent no 1,194,227 (hereinafter referred to as D2) discloses A process for stabilising a water permeable soil and rendering it substantially water impermeable, including the steps of injecting into the soil an aqueous solution of urea, formaldehyde and polyvinyl alcohol, all in the form of water soluble water condensation products; and insolubilising the mixture in situ by the action of an acidic curing agent for urea-formaldehyde resins.

A disadvantage of the process disclosed in D2 is that it is a relatively very fast reaction so that the mixture sets in a short time from 1.7 minutes to 8 minutes. This renders the process of D2 totally unsuitable for any application, such as road building, where relatively longer setting times are required.

OBJECTS OF THE INVENTION

Objects of the present invention are therefore to provide a binder composition and method for treating particulate material, to provide a method of preparing such a binder composition and to provide particulate material treated with the said method and binder composition, with which the aforesaid disadvantages can be overcome or at least minimised.

SUMMARY OF THE INVENTION

According to a first aspect of the invention there is provided a method of treating particulate material to form a solid aggregate matrix including the steps of:
- providing a urea formaldehyde precondensate;
- providing a polar solvent;
- providing additional urea;
- providing an acid or salt thereof;
- mixing the polar solvent, additional urea, precondensate, and acid to form a binder composition;
- mixing the binder composition with the particulate material; and
- allowing the binder composition to set over a period of time longer than 30 minutes to form a solid aggregate matrix, the acid or salt thereof being selected such as to render the pH of the binder composition to a value from 2.0 to 5.3.

The polar solvent may be selected from the group consisting of water, alcohol, and mixtures thereof.

Further according to the invention the method includes the further step of adding a sugar prior to the step of setting. The sugar may be selected from the group consisting of sucrose, glucose and fructose and mixtures thereof.

Further according to the invention the method includes the further step of adding a binding promoter for enhancing the binding between the binder composition and the particulate material, prior to the step of setting.

Yet further according to the invention the binding promoter is a complex fatty acid derived from the complete oxidation of vegetable sugars. More particularly, the binding promoter is selected from the group consisting of humic acid, fulvic acid, salts and mixtures thereof.

Alternatively or in addition the binding promoter is bitumen. The bitumen may be in the form of an anionic bitumen emulsion.

Further alternatively or in addition the binding promoter may also be in the form of a surfactant. The surfactant may be in the form of sodium dodecyl benzene.

The method may include the further step of adding any one or more agents selected from the group consisting of silicones, silanes, silanoles, oils, anti-corrosion agents, ultra violet light blocking agents, biocides, pH buffers, cement, ammonia, ammonium salts, plasticisers, ligna sulphinates and oxides thereof, phenols and mixtures thereof, prior to setting.

The plasticisers may be selected from the group consisting of phthalates, hydrocarbons, acetates, latex and glycols.

The ultra violet light blocking agents may be selected from the group consisting of organic phenols, phosphates and inorganic oxides.

The particulate material may be selected from the group consisting of sand, soil, gravel, natural or synthetic fibres including glass-, steel-, carbon- and polymeric fibres, clay, silicas, particulate ore, rubber, stones, pebbles, partly bound cementitious masses, grass, slag, waste dump material, coal particles, ash, and mixtures thereof.

Further according to the invention the formaldehyde:urea ratio in the binder composition is between 1.5 to 2.5:1, preferably 1.83:1.

The method may include the further step of compacting the aggregate matrix after the step of mixing and prior to the step of setting into a solid.

Further according to the invention, the acid is a weak organic acid. Preferably the weak organic acid is selected from the group consisting of citric acid and acetic acid and mixtures thereof.

According to a second aspect of the invention there is provided a method of preparing a binder composition for treating particulate material to form a solid aggregate matrix including the steps of:
  providing a urea formaldehyde precondensate;
  providing a polar solvent;
  providing additional urea;
  providing an acid or salt thereof;
  mixing the additional urea, polar solvent, urea formaldehyde precondensate, and acid to form a binder composition which sets into a solid over a period of longer than 30 minutes from being mixed with the said particulate material,
the acid or salt thereof being selected such as to render the pH of the binder composition to a value from 2.0 to 5.3.

The polar solvent may be selected from the group consisting of water, alcohol, and mixtures thereof.

Further according to the invention the method includes the further step of adding a sugar prior to the step of setting. The sugar may be selected from the group consisting of sucrose, glucose and fructose and mixtures thereof.

Further according to the invention the method includes the further step of adding a binding promoter for enhancing the binding between the binder composition and the particulate material.

Yet further according to the invention the binding promoter is a complex fatty acid derived from the complete oxidation of vegetable sugars. More particularly, the binding promoter is selected from the group consisting of humic acid, fulvic acid, salts and mixtures thereof.

Alternatively or in addition, the binding promoter is bitumen. The bitumen may be in the form of an anionic bitumen emulsion.

Further alternatively or in addition the binding promoter is in the form of a surfactant. The surfactant may be in the form of sodium dodecyl benzene.

The method may include the further step of adding any one or more agents selected from the group consisting of silicones, silanes, silanoles, oils, anti-corrosion agents, ultra violet light blocking agents, biocides, pH buffers, cement, ammonia, ammonium salts, plasticisers, ligna sulphinates and oxides thereof, phenols and mixtures thereof.

The plasticisers may be selected from the group consisting of phthalates, hydrocarbons, acetates, latex and glycols.

The ultra violet light blocking agents may be selected from the group consisting of organic phenols, phosphates and inorganic oxides.

The particulate material may be selected from the group consisting of sand, soil, gravel, natural or synthetic fibres including glass-, steel-, carbon- and polymeric fibres, clay, silicas, particulate ore, rubber, stones, pebbles, partly bound cementitious masses, grass, slag, waste dump material, coal particles, ash, and mixtures thereof.

The formaldehyde:urea ratio in the binder composition may be between 1.5 and 2.5:1, preferably 1.83:1.

Further according to the invention, the acid is a weak organic acid. The weak organic acid may be selected from the group consisting of citric acid and acetic acid and mixtures thereof.

According to a third aspect of the invention there is provided a settable binder composition for mixing with a particulate material and setting to form a solid aggregate matrix, the binder composition comprising a mixture of a urea formaldehyde precondensate; a polar solvent; additional urea; and an acid or salt thereof selected such as to render the pH of the binder composition to a value from 2.0 to 5.3 so that the binder composition sets into a solid over a period of time longer than 30 minutes from being mixed with the particulate material.

The polar solvent may be selected from the group consisting of water, alcohol, and mixtures thereof.

Further according to the invention the binder composition further includes a sugar. The sugar may be selected from the group consisting of sucrose, glucose and fructose and mixtures thereof.

Further according to the invention the binder composition includes a binding promoter for enhancing the binding between the binder composition and the particulate material.

Yet further according to the invention the binding promoter is a complex fatty acid derived from the complete oxidation of vegetable sugars. More particularly, the binding promoter is selected from the group consisting of humic acid, fulvic acid, salts and mixtures thereof.

Alternatively or in addition the binding promoter is bitumen. The bitumen may be in the form of an anionic bitumen emulsion.

Further alternatively or in addition the binding promoter is in the form of a surfactant. The surfactant may be in the form of sodium dodecyl benzene.

The binder composition may include any one or more agents selected from the group consisting of silicones, silanes, silanoles, oils, anti-corrosion agents, ultra violet light blocking agents, biocides, pH buffers, cement, ammonia, ammonium salts, plasticisers, ligna sulphinates and oxides thereof, phenols and mixtures thereof.

The plasticisers may be selected from the group consisting of phthalates, hydrocarbons, acetates, latex and glycols.

The ultra violet light blocking agents may be selected from the group consisting of organic phenols, phosphates and inorganic oxides.

Further according to the invention, the formaldehyde:urea ratio is between 1.5 and 2.5:1, preferably 1.83:1.

Further according to the invention the acid is a weak organic acid. The weak organic acid may be selected from the group consisting of citric acid and acetic acid and mixtures thereof.

According to a fourth aspect of the invention there is provided a solid aggregate matrix formed by treating a body of particulate material by a method according to the first aspect of the invention.

According to a fifth aspect of the invention there is provided a solid aggregate matrix formed by treating a body of particulate material with a binder composition according to the third aspect of the invention.

According to a sixth aspect of the invention there is provided an artefact formed from a solid aggregate matrix according to the fourth or fifth aspects of the invention.

FURTHER DESCRIPTION OF THE INVENTION

According to a preferred embodiment of the invention a binder composition for treating particulate material to form a solid aggregate matrix is prepared through a method including the steps of:

providing a urea formaldehyde precondensate (UFC);
providing a polar solvent such as water;
providing additional urea;
providing an acid or salt thereof, preferably in the form of a weak organic acid such as citric acid or acetic acid, the acid or salt thereof being selected such as to render the pH of the binder composition to a value from 2.0 to 5.3;
providing a sugar selected from the group consisting of sucrose, glucose and fructose and mixtures thereof;
providing a binding promoter for enhancing the binding between the binder composition and the particulate material;
optionally providing any one or more agents selected from the group consisting of silicones, silanes, silanoles, oils, anti-corrosion agents, ultra violet light blocking agents, biocides, pH buffers, cement, ammonia, ammonium salts, plasticisers, ligna sulphinates and oxides thereof, phenols and mixtures thereof; and
mixing the above so as to form a binder composition.

The binder composition is mixed with particulate material and allowed to set into a solid aggregate matrix over a period of longer than 30 minutes from being mixed with the said particulate material. The binder composition is mixed with the particulate material either through physical agitation or by penetration and adsorption.

After the step of mixing and prior to the step of setting, the aggregate matrix could optionally be compacted and/or shaped into an artefact such as a brick, paving stone or the like. In a preferred embodiment the water dissolved or suspended chemicals are mixed into the particulate material physically with a spade, grader, rake, plough, etc. and then compacted. Compaction plays a vital role as this allows the polymer chains to form in close proximity to the surface of the particles. Compaction is further important as it greatly enhances the strength of the solid aggregate matrix.

The binding promoter is preferably a complex fatty acid derived from the complete oxidation of vegetable sugars. More particularly, the binding promoter is selected from the group consisting of humic acid, fulvic acid, salts and mixtures thereof. Another binding promoter which is added is bitumen, preferably but not exclusively in the form of an anionic bitumen emulsion. Yet another binding promoter that is added is a surfactant, preferably but not exclusively sodium dodecyl bensene.

The plasticisers are preferably selected from the group consisting of phthalates, hydrocarbons, acetates, latex and glycols.

The ultra violet light blocking agents are preferably selected from the group consisting of organic phenols, phosphates and inorganic oxides.

The particulate material which is suitable for treatment with the binder composition is preferably but not exclusively selected from the group consisting of sand, soil, gravel, natural or synthetic fibres including glass-, steel-, carbon- and polymeric fibres, clay, silicas, particulate ore, rubber, stones, pebbles, partly bound cementitious masses, grass, slag, waste dump material, coal particles, ash, and mixtures thereof. The particulate material could also include natural or synthetic fibres such as glass, steel, carbon or synthetic plastics or polymeric material fibres to provide added strength, or a thermoplastic resin to supplement or enhance certain properties of the matrix or to improve its resistance, strength and water insolubility.

The formaldehyde:urea ratio in the binder composition is selected to be between 1.5 and 2.5:1, preferably, but not exclusively 1.83:1.

It was firstly surprisingly found that, owing to the selected pH range of the binder composition according to the invention, it sets into a solid body over an extended period of time from being mixed with the particulate material from at least 30 minutes to a plurality of days and that the setting process may even continue to take place gradually over a period of 45 days.

It was further surprisingly found that the addition of sugars and/or complex fatty acids derived from the complete oxidation of vegetable sugars, such as humic and fulvic acids, salts and mixtures thereof, greatly enhances the binding properties of the binder composition. The effect of adding humic acid is illustrated in the last two Examples in this specification.

Owing to the pH range to which the pH of the binder composition is adjusted through the addition of the acid, the setting time of the binder composition, when mixed with the particulate material is relatively longer than with the prior art compositions, more particularly, longer than 30 minutes and even as long as 45 days. This allows sufficient time to mix the binder composition with several tonnes of soil in the morning, and applying and compacting the mixture throughout the day without the binder composition setting in the mean time to such an extent that the particulate material is not effectively bound several hours after preparing and mixing the binder composition. It was further surprisingly found that a relatively superior solid aggregate matrix is obtained where the setting takes place over an extended period of time.

When constructing roads and similar surfaces such as landing strips, the binder composition is mixed with suitable particulate material and the mixture compacted onto the substrata prior to setting, to form a solid aggregate matrix. Such matrix is water resistant, inert, stable, durable, and resistant to wear. It will be appreciated that, alternatively, the binder composition could be sprayed onto the substrata and thereafter be covered with the particulate material.

The characteristics of the aggregate matrix could be adjusted further by adding additional agents as set out above. Plasticisers such as phthalates, hydrocarbons, acetates, latex or glycols add more suppleness and flexibility to the solid aggregate matrix.

Ultra violet light blocking agents such as organic phenols, phosphates or inorganic oxides are useful to stop ultra violet light degradation of the aggregate matrix. A biocide inhibits fungal or bacterial growth in the matrix.

In one embodiment of the invention, the particulate material is soil. The mass ratio of the binder composition:soil is selected to be from 0.01:0.99 to 0.25:0.75. Typically, the mass ratio of the binder composition:soil is 0.03:0.97. Similar mass ratios can be used for other types of particulate material.

Preferably the mixture of the binder composition and soil has a moisture content (Optimum Moisture Content or OMC) of between 3 and 45% on a mass per mass basis, depending on the particular application. The bitumen emulsion comprises an anionic or cationic emulsifier, and forms from 0.2% to 40% on a mass per mass basis of the total mixture.

For road building and obtaining optimum compaction, soil has to be brought to an optimum moisture content value (OMC) for that soil. This is easily calculated by determining the amount of water to be added e.g. 3% to a small sample of particulate material to get it to the OMC for best compaction (keep adding 1% at a time to a soil sample until it makes a ball in your hand or measure in a laboratory). This amount of water will result in much more strength in the particulate material for mix-in applications that are compacted. For spray-on or sand-seal applications much more water can be used, where the water becomes a very effective spreading or permeating agent apart from being a solvent. This economically spreads the binder composition over the desired area, to the desired depth or enables it to be pumped over a distance such as when spraying an embankment. The desired dosage rate of binder composition in the particulate material is thus obtained and an effective solid aggregate matrix is formed. The amount of water present could further be used to adjust the strength or attributes in a body of particulate material through migration of agents and promoters towards the surface of an artefact while drying. The agents or promoters are therefore concentrated towards the surface to provide a relatively harder layer towards the surface.

All reagents and components are preferably added and mixed at a temperature of 50° C. or less, typically 30° C. or less, e.g. at ambient temperature.

The additional urea and other ingredients are selected such that the molar ratio of formaldehyde:urea is selected to be between 1.2 to 2.5:1, preferably 1.83:1, so that there is sufficient formaldehyde available to allow further cross linking to take place over an extended time period in the solid aggregate matrix, without having an excess of formaldehyde which could cause unwanted formaldehyde emissions.

The free formaldehyde content of the UFC is reduced to minimise formaldehyde emissions e.g. 70% bound formaldehyde vs. 30% free formaldehyde or 88% bound formaldehyde vs. 12% free formaldehyde. However, the viscosity of the latter ratio increases and shelf life decreases, whereas in the former ratio it pours more easily and has a longer shelf life.

Usually the UFC contains closer to 50/50 bound and free formaldehyde but even formalin could be used and which contains no bound formaldehyde. UFC can be used in undistilled format and which contains relatively much more water to reduce emissions of formaldehyde owing to the hygroscopic nature of formaldehyde that is contained in the extra water as formalin.

This invention substantially reduces emission of formaldehyde fumes during application. Factors that contribute to this major benefit are the weak organic acid that is used, the bitumen emulsion, relatively high quantities of water, the additional binding promoters and agents, and the relatively slow reaction time, which keep reaction temperatures relatively lower. Prior art uses of urea formaldehyde resins usually occur faster and at higher temperatures with possibly higher emission rates, often resulting in a gel rather than the hard solid attained in this invention.

The sequence in which the chemicals are mixed is further of importance. It was surprisingly found that less formaldehyde emissions occur when the urea is first dissolved in water, then bitumen emulsion added, then UFC, then the other binding promoters and agents, and then the weak organic acid.

The reaction time could be decreased to allow more working time, especially at higher temperatures (e.g. summer or warmer regions), by using a buffer or less acid in the reaction, to react with the chemicals at a relatively higher pH e.g. pH 4.5. For a faster reaction time the pH could be reduced by adding more acid to reduce the pH of the solution to say pH 3.5 or below. Extreme pH values i.e too high or too low, during reaction result in a weaker polymer forming. The quantum and type of acid used, could also be adjusted to compensate for too alkaline or acidic substances present in the particulate material.

Anionic bitumen emulsion is preferred as its alkaline property allows the addition of relatively more acids described above, which improves the binding characteristics of the binder composition. During tests it has been established that anionic bitumen emulsion (60/40 suspension of bitumen in water with an emulsion) adds further water resistance, strength and suppleness to the solid aggregate matrix. Bitumen is mainly a hydrocarbon at the end of the oil refinery process and also contains many organic substances that tend to improve the binding characteristics of the binder composition. Foamed bitumen or non-ionic or cationic bitumen emulsions could alternatively be used.

When the binder composition is sprayed onto a body of particulate material and permeates into the body, the solids in the composition, such as bitumen and latex separate from the binder composition towards the surface of the body of particulate material to form a skin on the surface. This skin assists in reducing formaldehyde emissions and retains the formaldehyde for further binding with urea (rather than to let it evaporate). The skin further protects the aggregate matrix from rain, for example, while setting. For example, when sprayed onto soil, the solid bitumen parts from the solvent and remains on or near the top of the particulate material while the balance of the binder composition penetrates along with the water deeper into the particulate material. This forms a hardened solid aggregate matrix in different layers where the bitumen content can be adjusted to allow evaporation of water vapour through the not entirely dense bitumen skin on or near the surface of the particulate material. This allows the solid aggregate matrix to dry out while the bitumen skin forms a protective skin to restrict water from penetrating into the solid aggregate matrix. This bitumen is further strengthened by some of the remaining binder composition in the same area. A higher bitumen dosage therefore forms a water impermeable skin on or near the surface.

Similarly other alkaline substances such as Portland or other types of cement could be used to achieve a more effective binder composition and an increase in strength of the solid aggregate matrix. Cement could also be added to provide early and additional wet strength on or near the surface, to react with water, and to break the bitumen from its emulsion.

The use of latex in this invention has also been found to enhance the qualities of the solid aggregate matrix. For example, latex imparts further waterproofing, strength and suppleness characteristics to the solid aggregate matrix, while retaining the colour of the particulate material. Clear latex therefore acts similarly to bitumen when included in the binder composition, with the difference that the colour of aesthetically appealing inert particles such as clay, silt or sandstone particles is preserved. The latex in combination with these particles therefore provide an attractive coloured skin (instead of black bitumen) which retains the natural appearance of the inert particles and/or reduce painting cost and/or furnish other attributes to the surface of the solid aggregate matrix. This lowers the cost relative to using solid additives or latex throughout the solid aggregate matrix.

The binder composition is prepared in liquid form in a water solution that is capable of permeating even fine soils and which then sets to form a water insoluble binder composition in the solid aggregate matrix which does not leach out. Water forms an important and integral part of the binder composition, as it serves to dissolve urea granules, to dilute the solution for easy pumping or spraying, to contain highly water soluble formaldehyde vapours in the solution or solid aggregate matrix, for relatively higher strength and relatively less emissions. Water is further an excellent and low cost spreading agent to promote permeation of the binder composition into the particulate material for consistent strength throughout the solid aggregate matrix.

It was found that the binder composition binds fine particles together in a solid aggregate matrix where many other binder compositions fail to do so. The binder composition therefore forms an excellent dust inhibitor which keeps fine particles of the particulate material in the solid aggregate matrix, which particles become water insoluble and do not leach out once reacted. This layer of hardened particulate material has relatively improved wet and dry strength.

It was further surprisingly found that the binder composition and particulate material mixture binds with set cement and other inert surfaces. A further aspect of this invention is that this binder composition does not need curing with water (as does cement) but is simply left to dry.

As the particulate material forms an important part of the eventual solid aggregate matrix, additional relatively finer or coarser materials could be added to improve the strength of the end product, should the strength of the end product be insufficient. These finer or coarser particles are often available from nearby the site where the solid aggregate matrix is constructed.

As stated hereinbefore, the binder composition and particulate material mixture could be compacted and shaped into artefacts, and allowed to set to provide hardened slabs, blocks or tiles, bricks, and the like.

Further as hereinbefore stated, a road could be constructed by mixing the binder composition with the particulate material, compacting the mixture and allowed to set to form a solid aggregate matrix on setting in a substrata layer. Further layers could be constructed on top of the substrata layer from the binding composition and particulate material mixture. However, with the further layers, the composition of the binder composition is each time adjusted or selected to impart particular characteristics to the further layers so that they could be relatively harder or more resistant to wear and water. This could be achieved by adding more bitumen or having a higher ratio of binder composition to particulate material. Thus one solid aggregate matrix could consist of several different solid aggregate layers which increase in hardness towards the outer layer. This has the advantages that the relatively harder and possibly denser outer layer protects the substrata layers, by resisting wear and water to keep the substrata layers dry and coherent. To this hardened outer layer could be added a chemically hardened sand seal to further protect the outer layer from wear. This could also be done later as maintenance or for preventative maintenance.

The invention will now be described further, by way of a plurality of examples, with reference to the accompanying figures and tables. For the sake of clarity, the descriptions of the sets of figures are each time set out at the associated example.

Example 1

To provide a solid aggregate matrix according to the invention by preparing a binder composition and mixing the binder composition with a body of particulate material:

1. Take 1 kg of particulate material in the form of soil, preferably evenly graded with small to larger particles;
2. Establish the moisture content whereby this soil compacts optimally e.g. 5% water added (weight/weight) and place water (50 g for example) in a mixing vessel;
3. Add 7 g of urea granules to the water and stir for 15 minutes or until dissolved;
4. Add 15 g of bitumen emulsion (anionic);
5. Add 22 g of UFC;
6. Add 1 g of citric acid previously treated with sugars—dissolved into it (say 30% concentrate);
7. Add 1 g humic acid (reduce or increase acid if pH is less than 3 or more than 5);
8. Add the other additives as required e.g. 0.006 g silanes (or 0.02% of the weight of the solution);
9. Mix thoroughly with the soil by agitation or permeation;
10. Mix 2 grams of latex with 8 grams of water and mix this well into the particulate material;
11. Mix 5 grams of the chemicals in 3 to 8 above with 5 grams of water and spray onto particulate material;
12. Compact well; and
13. Allow to set at ambient temperature without curing with water to form a solid aggregate matrix.

Example 2

1. Follow steps 1 to 8 above;
2. Add relatively more water to ensure deeper penetration of the binder composition;
3. Spray the liquid onto the surface of the soil;
4. Spray the mixture of step 10 above onto the soil (only permeate or mix in);
5. Let dry until closer to optimum moisture content;
6. Compact (less compaction than in example 1); and
7. Allow to set without curing with water to form a solid aggregate matrix.

An effective solid aggregate matrix can thus be obtained by using the method described above and by optimally adjusting the following factors:

Using the best soil or particulate material available economically at a particular location, or importing and mixing other soil or particulate materials into this particulate material to obtain a more continuous grading of particles or other properties desired or available;

Batching and mixing the chemicals in optimal ratios;

Mixing these chemicals with the correct amount of water to obtain optimum or effective compaction and or permeation of the particulate material;

Mixing the particulate material, chemicals and water together or allowing the permeation of the liquids, solids and gases into an effective mix in the particulate material;

Causing the desired form of the solid aggregate matrix by shaping or permeating the particulate material and solid aggregate matrix into this form; and Compacting the solid aggregate matrix in this form or allowing the mixed in or permeated chemicals to set in this form.

A further advantage of this invention is that the binder composition weighs relatively little e.g. 58 kg chemicals to harden 1 $m^3$ (one cubic meter) (say 1900 kg) of soil.

Yet another advantage of this invention is that this binder composition binds a relatively very wide range of soils effectively. Thus in situ soils can often be used without having to replace these soils with better quality soils. It also binds fine particles, which few or no other binder compositions bind effectively or economically.

The above factors reduce transportation and handling costs substantially, as less chemicals are transported to site and soils or particulate material often do not have to be transported from or to site.

Example 3

A 100 kg mixture of the binder composition and particulate material (soil) was prepared by mixing the following ingredients together:

| | |
|---|---:|
| urea-stabilised formaldehyde (UFC) | 2000 g |
| bitumen emulsion | 1000 g |
| phenol | 250 g |
| urea | 379 g |
| citric acid | 80 g |
| water | 3000 g |
| soil | 93 291 g |

The urea-stabilised formaldehyde solution (UFC) used was Inkunite UFC (registered trade mark) obtained from Resinkem (Pty) Limited, Umbogintwini, South Africa, 4120. The lnkunite had a formaldehyde content of between 51 and 58% by mass, a urea content of between 22 and 28% by mass and a pH of between 6.5 and 8. The bitumen emulsion had a bitumen concentration of about 60%. The soil included fine sand and had a moisture content of about 5%.

The mixture of the abovementioned ingredients was formed into the shape of bricks, compacted, and left to dry, set and harden at room temperature to form a solid aggregate matrix.

Example 4

Soil was stabilised as follows:

12.5 g of Inkunite UFC, 7.5 g urea, 40 g of water and 20 g of a bitumen emulsion were added together and thoroughly mixed. A weak organic acid, in the form of citric acid, was added to lower the pH to be between 3 and 4.5. The resultant binder composition was added to 1 kg of soil and mixed well into the soil to obtain a good distribution of the binder composition throughout the soil. Water was added to bring the total moisture content of the soil and binder composition mixture to the optimum moisture content for the specific compactive effort that would be used for the said mixture. The mixture was then compacted in a conventional manner and allowed to dry, set and harden at room temperature.

Example 5

Experiments were conducted to compare the binder compositions produced by using formalin and Inkunite UFC. 22 g of formalin and Inkunite respectively was mixed with 13 g of urea and 0.0065 g of citric acid. The pH of the Inkunite used was 5.45 and that of the formalin was 3.85. The formalin comprised 37% formaldehyde and 7% methanol. Three different mixtures were prepared and left to react. The first mixture was made from Inkunite, had an end pH of 5.45 and the urea:formaldehyde molar ratio was 1:1.4. The second mixture was made from formalin, had an end pH of 5.45 and the urea:formaldehyde molar ratio was 1:1.25. The third mixture was also prepared from formalin, had an end pH of 3.85 and the urea:formaldehyde molar ratio was also 1:1.25. Raman spectra of the final set products were taken and the gel time of each mixture was measured.

The first mixture had a gel time of 615 minutes, the second mixture had a gel time of 1400 minutes and the third mixture had a gel time of 65 minutes. As will be noticed, although the first mixture and the second mixture had the same pH, the gel time of the first mixture, prepared from Inkunite was much less than the gel time of the second mixture prepared from formalin. The experiments also clearly illustrate the drastic effect of pH. The Raman spectra for the three mixtures showed that there were only a few differences in the spectra of the three amino resins formed.

Example 6

This example illustrates the preparation of an aqueous solution of urea-stabilised formaldehyde. This example also illustrates that it is possible to prepare such a urea-stabilised formaldehyde precondensate on a building site, at ambient temperature using formalin and paraformaldehyde.

Commercially available urea-formaldehyde precondensate, such as Inkunite is manufactured from urea and formalin by letting the hydroxymethylation reaction take place to a certain extent at an alkaline pH and then, by rendering the solution acidic, to let the condensation take place. The solution is again made alkaline and acidic to let the total reaction proceed to a specific limit. Excess water is then removed and the liquid resin purified in four distillation columns in series.

In contrast to the above commercial procedure, urea formaldehyde UFC mixtures were prepared by dissolving 10 g of paraformaldehyde and 20 g of mixtures containing methanol and formalin and adjusting the pH of the mixtures to about 10. The 20 g mixtures of methanol and formalin contained different methanol concentrations varying between 7% and 50%.

In each case, after 5 minutes of stirring, urea was added to the mixtures and the stirring continued for a total of 2 hours. Thereafter the liquid, if any, was removed and the amount of paraformaldehyde not dissolved was separated, dried and weighed.

The experiments showed that there is a clear correlation between the methanol content of the methanol-formalin mixture and the solubility of the paraformaldehyde in the formalin, the solubility of paraformaldehyde increasing with increasing methanol content. The experiment was extended by determining the shelf life of the UFC prepared, after water was evaporated to provide a UFC having a water content of about 20% by mass. The shelf life was found to be about 4 days, and was found to be mostly independent of the pH of the UFC in the pH range of 6 to 8. The shelf life was defined as the time it took for the clear UFC to become cloudy.

Example 7

The influence of pH on amino resin properties and gel time was investigated at a fixed urea:formaldehyde molar ratio of 1:1.4 by preparing mixtures of urea and Inkunite and then adjusting the pH step by step downwards by adding citric acid. The effect of pH on resin properties were investigated at pH 4.2, 4.5, 4.9 and 5.2 and the gel time was measured for each pH mixture. The amino resin aggregate matrixes were left to set for about 2 days and then visually compared.

It was found that the gel time increases drastically with increasing pH, being about 50 minutes at a pH of 4.5 and about 520 minutes at a pH of 5.2. However, the amino resin products formed at different pH values were similar, all being very hard, very homogeneous and not very crystalline. All had excellent water resistance. This is in contrast with the properties of amino resins formed at different pH from formaldehyde and urea, which ranges from a white solid through a gel to a precipitate with increasing pH.

Example 8

20 g of paraformaldehyde was dissolved in 40 g of a mixture containing equal amounts of methanol and formalin and the pH was adjusted to about 10 with NaOH. After 5 minutes of stirring 10 g urea was added to the mixture and stirring continued for 2 hours. A number of samples with different pH values were then prepared, ranging between a pH of 5 and a pH of 7.5 at 0.5 pH intervals. After 24 hours the samples were compared. After 1 month, 22 g of each of the samples that were clear and stable were reacted with 13 g urea each and the pH adjusted to 4.2. The final products were compared with amino resins prepared from urea and formaldehyde at a pH of 4.2.

It was found that, in all cases except for pH 5.5 and 6, a solid product was formed. Thus, at pH lower than 5 a normal condensed amino resin formed, and at high pH monomethylolurea or dihydroxymethylurea formed. Only at pH 5.5 and 6 did a viscous liquid form that had a shelf life of more than a month. When 22 g of these liquids was respectively added to 13 g of urea and the pH adjusted to 4.2 a smooth, hard product formed without any cracks in both cases.

Example 9

The influence of urea:formaldehyde molar ratio on amino resins prepared from urea-stabilised formaldehyde is illustrated in this Example.

30 g of urea was added to Inkunite to provide a urea:formaldehyde molar ratio of 1:2 and the pH of the resultant mixture was measured at 5.12. A small quantity of citric acid as a source of free hydrogen ions was added. In a similar manner, a mixture with a molar ratio of 1:1.4 was prepared, and the viscosity and gel time of the mixtures were measured. The resultant amino resins were left to dry for 2 days and their properties visually compared.

It was found that the 1:2 molar ratio mixture reacted quickly to become a gel, but took three days to solidify. The 1:1.4 molar ratio mixture gelled and solidified quicker. The 1:2 molar ratio product was very smooth, hard and had no cracks. The 1:1.4 molar ratio product was more brittle and had small cracks. Both products became soft when placed in water, but harden again when dried. The 1:2 molar ratio product had much better water resistance, which can possibly be attributed to the fact that the water is slowly displaced from the resin as the cross linking starts, while when the cross linking occurs quickly, the water is trapped inside the resin solid aggregate matrix and due to adhesion forces the resin can crack and become brittle.

An advantage of the 1:2 molar ratio resin is that it requires 40% less urea than the 1:1.4 molar ratio resin, which has raw material cost and transport cost implications.

Example 10

A series of tests were conducted to determine the effectiveness of a cold-setting amino resin prepared from urea-stabilised formaldehyde and urea (referred to as resin A) with that of a cold-selling amino resin prepared from formaldehyde and urea (referred to as resin B). Resin A was prepared using 1.67 g Inkunite per gram urea. Resin B was prepared using 1.67 formalin (37% formaldehyde and 7% methanol) per gram urea. When bitumen was used, an anionic bitumen emulsion (SS60) was used.

The liquid resin was mixed with the soil, compacted and then subjected after some time to the indirect tensile strength (ITS) test. The soil was a dark brown shale and fine gravel mixture 95% of which passed through a 13.2 mm screen. It had an optimum moisture content of 9.6%, a hygroscopic moisture content of 2.6% and a maximum dry density of 1985 kg/m$^3$. A Marshall apparatus was used for the ITS tests and samples were compacted using 75 blows for bituminous mixtures and 50 blows for other mixtures in standard moulds of 101.6 mm inside diameter. For wet strength tests, the samples were soaked for 24 hours in water. All test were conducted at 23 degrees Celsius and 85 kPa atmospheric pressure.

The tests showed that soils stabilised with resin A and resin B which included bitumen had the same initial increase in strength, but the addition of bitumen results in a higher maximum strength for the stabilised soil. The maximum strength results within about 7 to 24 days, after all the water has evaporated from the samples.

Resin A stabilised soil initially had a lower dry strength than resin B stabilised soil, but later on increased to values even higher than those of resin B stabilised soil. However, resin A with bitumen stabilised soil had a much lower wet strength than resin B with bitumen stabilised soil. Wet and dry strength for both resin stabilised soils reached an optimum when the soil was at its optimum moisture content (OMC), irrespective of the presence of bitumen.

Both the wet and dry strength of the stabilised soil samples increased with increasing dosages of resin A and resin B, but reached a limit (at about 5% by mass) for dry strength where addition of more resin did not increase the dry strength.

For both resin A and resin B the strength of the stabilised soil increased as the reaction pH was lowered from 7 to about 4, and this increase was enhanced by the addition of bitumen emulsion. However, the effect of bitumen on the dry strength of soil stabilised with resin A was marginal.

At a urea:formaldehyde molar ratio of 1:2 the dry strength of both resin A and resin B stabilised soil samples reached an optimum. The wet strength improved at higher molar ratios for resin A stabilised soil samples.

It is an advantage of the invention that urea-stabilised formaldehyde can be used, resulting in less formaldehyde fumes being produced, a more neutral pH being employed, more predictable evenly cross linked polymers being formed, improved user and ecological friendliness and less transport costs due to lower water content and lower flammability. A soil stabilising binder composition made in accordance with the invention advantageously has a shorter gel time than a conventional urea formaldehyde soil stabilising binder composition. A further advantage is that paraformaldehyde can be used to prepare urea-stabilised formaldehyde.

Example 11

This Example makes reference to the following enclosed drawings wherein.

Figure 4:
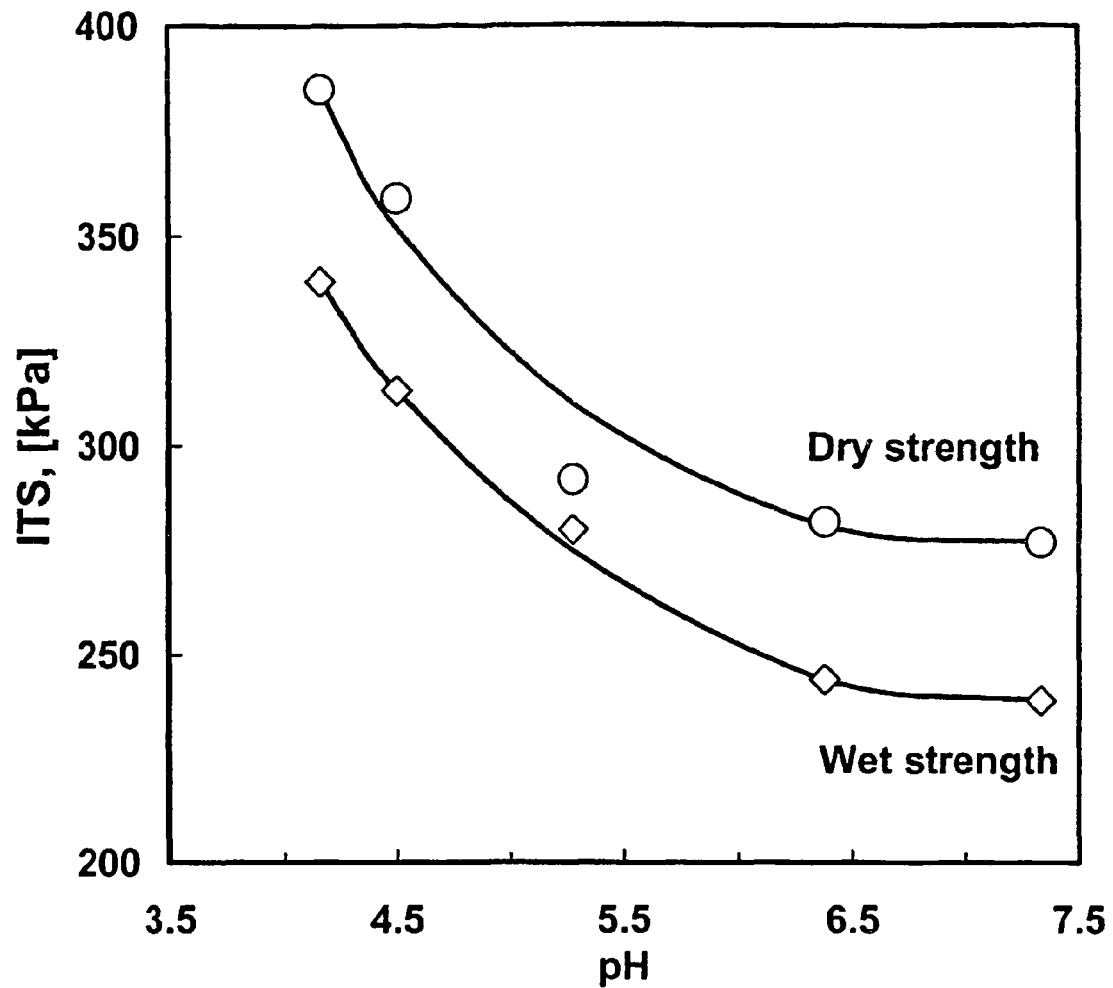
Figure 5:
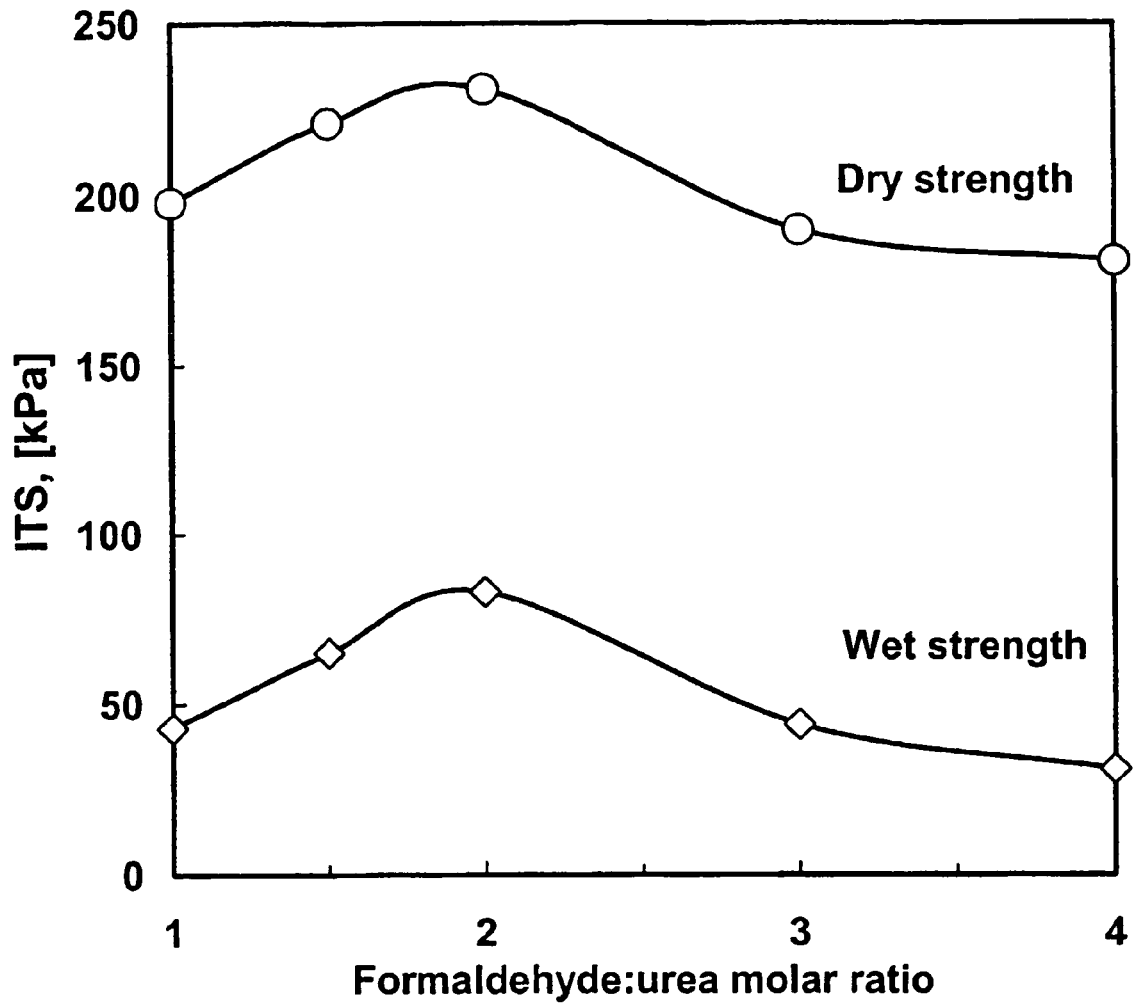
Figure 6:
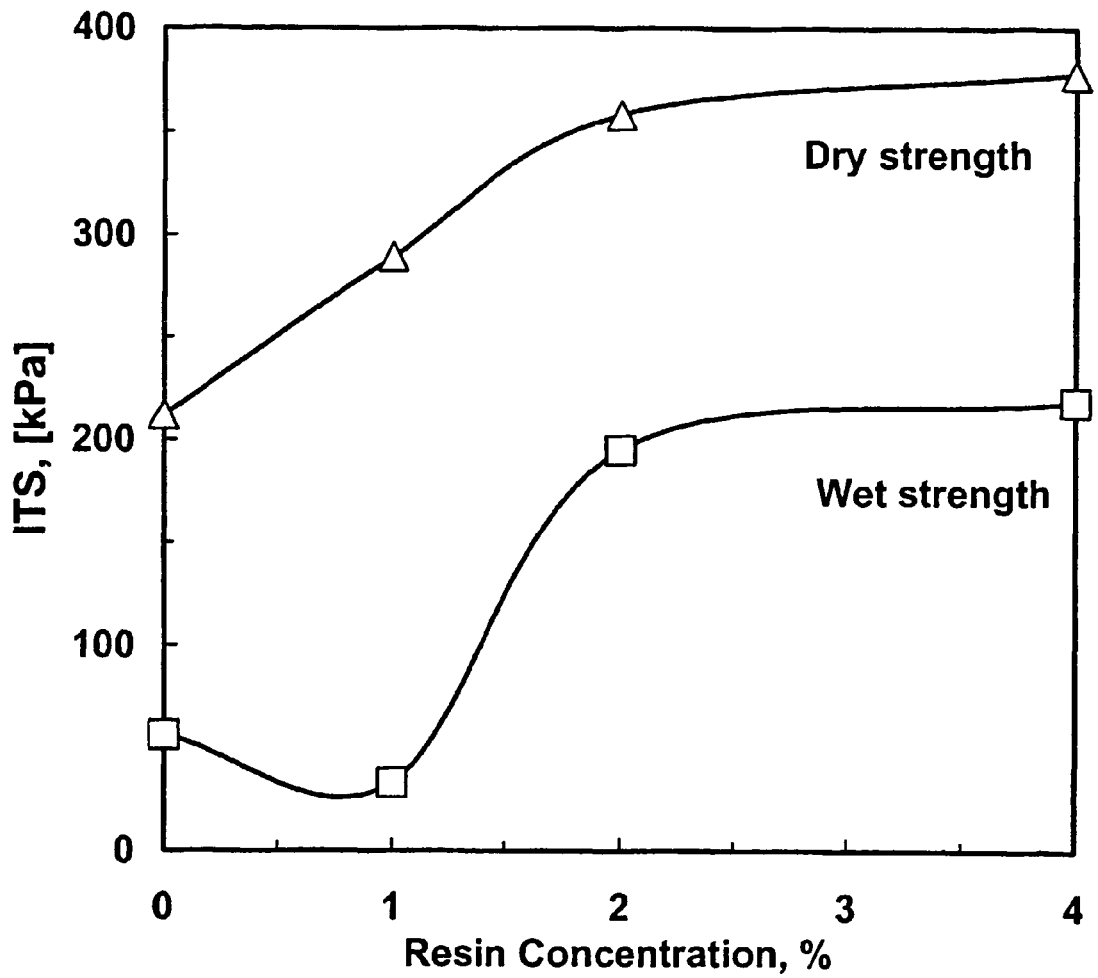
Figure 7:
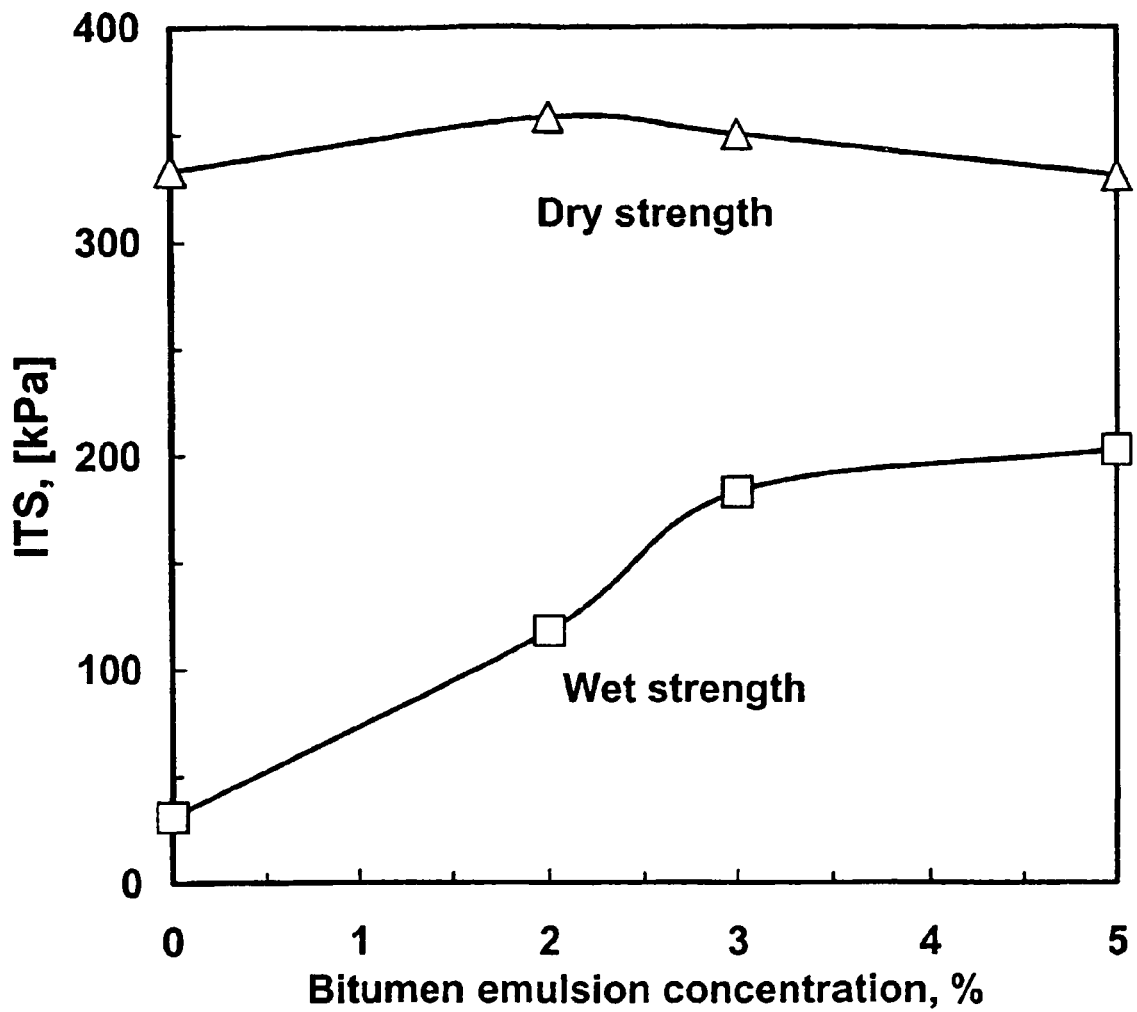
Figure 8:
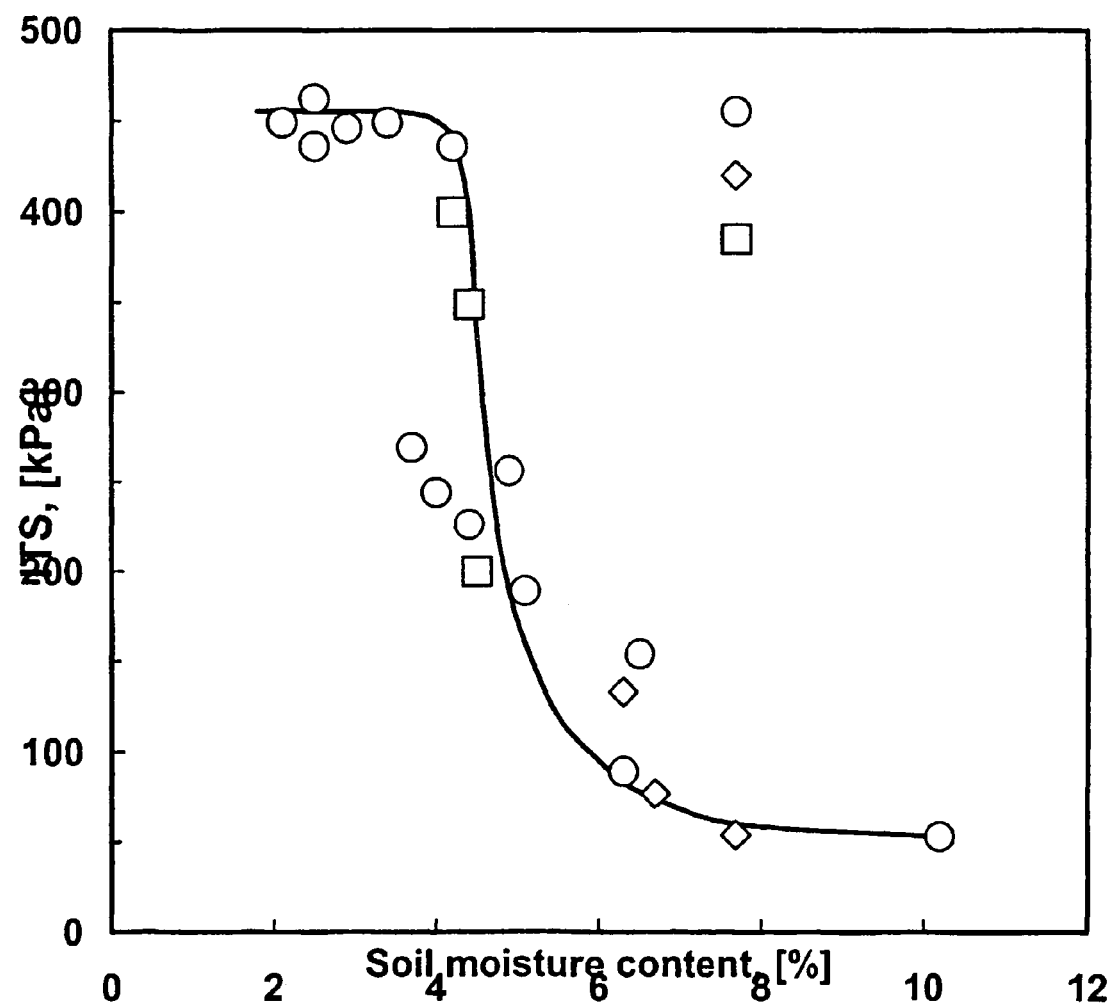
Figure 9:
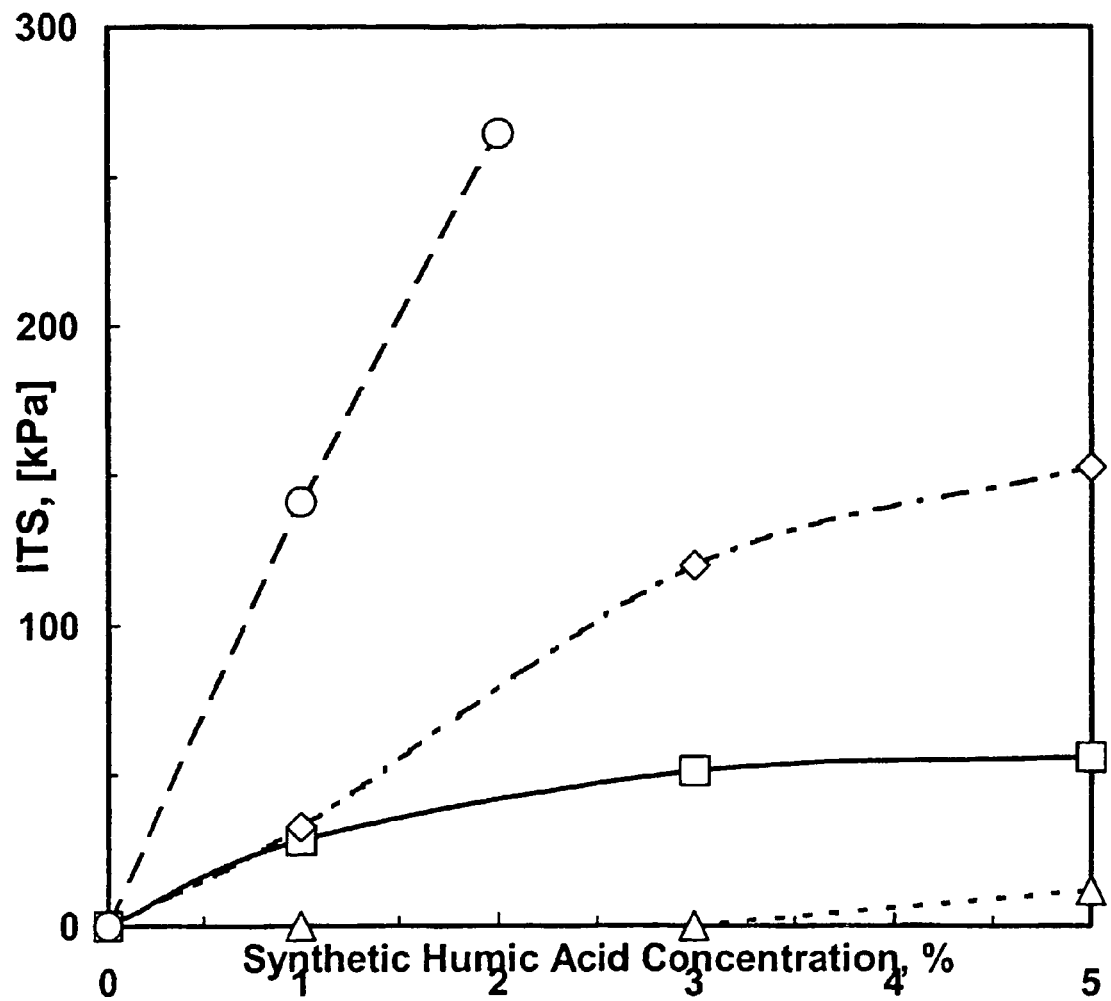

FIG. 4 shows the effect initial resin pH has on the 7-day strength of soil stabilised with 2% binder composition and 2% anionic bitumen emulsion, the initial soil moisture content was set at 10%;

FIG. 5 shows the effect the reactant stoichiometry has on the 7-day strengths of soil stabilised with 2% binder composition and 2% anionic bitumen emulsion, the soil moisture content was set at 10% and the resin pH adjusted to pH=4.5;

FIG. 6 shows the effect of resin concentration on the dry- and wet strengths of a soil containing 2% anionic bitumen emulsion, resin pH was adjusted to pH=4.5 and soil moisture content to 10%, samples were dried in air for 21 days before testing;

FIG. 7 shows the effect of anionic bitumen emulsion concentration on the dry- and wet strengths of the soil containing 2% resin, resin pH was adjusted to pH=4.5 and soil moisture content to 10%, samples were dried in air for 21 days before testing;

FIG. 8 shows the effect of the final moisture content on the strength of soil stabilised with 2% binder composition and 2% anionic bitumen emulsion, the formaldehyde:urea molar ratio was 1.5:1 and the resin pH=4.5, samples were either dried in air or cured covered in polyethylene bags; and FIG. 9 shows the effect of synthetic fulvic acid addition on 7-day dry strength of soils devoid of natural organic substances, where indicated, binder composition and/or anionic bitumen was added at the 2% level.

Its low cost and ready availability should make soil an ideal material for road construction. Unfortunately, soil usually has a low wet strength and exhibits poor volume stability with respect to moisture content. The usual high water permeability further exacerbates these undesirable properties. Soil stabilisation is the process whereby the existing engineering properties are modified to such an extent that the soil becomes a useful material of construction. Ideally the stabilised road material must be able to offer sustained resistance to deformation under repeated loads in both wet and dry conditions (Ballantine and Rossouw, 1989). Desired soil property improvements include increased workability during construction, as well as higher strength, durability and dimensional stability in the end-use application. Cement, lime, bitumen and tar are well-established soil stabilisers with proven track records (Road Research Laboratory, 1952).

The soil volume stability refers to its ability to resist swelling and shrinkage with changes in moisture content. Swelling, in particular, is a problem associated with clayey soils. It can cause disintegration of road surfaces and cracking of buildings. Several strategies are employed to prevent, or at least reduce, shrinkage and swelling. One approach aims to reduce the intrinsic tendency of the clay component to swell. This can sometimes be achieved by the simple addition of lime to the soil. Another approach seeks to prevent water ingress, e.g. by sealing soil pores with hydrophobic additives such as bitumen. Converting the soil into a granular mass can reduce the effect of moisture. Binding the soil particles together by a cementation process can also increase soil stability (Ballantine & Rossouw, 1989, Visser, 1994).

This Example relates to the laboratory optimisation of a binder composition based soil stabiliser system in accordance with the invention. The indirect tensile strength (ITS) was used as a measure of soil stabilisation efficacy. The effects of cure pH; reactant stoichiometry; the type of bitumen emulsion used; and the importance of organic soil components on stabilisation performance were investigated. The influence of soil moisture content and stabiliser dosage level was also evaluated.

Experimental

Unless otherwise stated, all experiments were carried out at a constant temperature of 23° C.

Reagents.

Technical grade formaldehyde solution (37% stabilised with 7% methanol) and fertiliser grade urea (46% N) were obtained from commercial sources. Chemically pure citric acid, calcium hydroxide and sodium hydroxide were obtained from Chemical Supplies and used as is. Anionic bitumen emulsion (Grade SS60) and cationic bitumen emulsions (Grades KRS60 and KMS60) were obtained from Tosas.

Resin Sample Preparation.

Resin mixtures were prepared by dissolving the appropriate amount of solid urea in (diluted) formaldehyde solution. The pH was then adjusted to the required value by adding either citric acid or sodium hydroxide. Where necessary, the required quantity of bitumen emulsion was added. The effects of pH and reactant stoichiometry on resin gel-time were determined on 10 ml samples. For the temperature effect, 200 ml samples placed in a water bath were used. Viscosity changes during the cure reaction were followed with a Brookfield viscometer.

Test Soil.

The properties of the brown shale used in this study are presented in Table 1. The soil was classified as a G7 material in terms of TRH 14 (1985). The moisture content of the soil was maintained by storing it in a sealed plastic bag.

TABLE 1

Test Soil: Dark brown shale with a quantity of sand stone and fine gravel

| 1. Constants: | | Units | | | | |
|---|---|---|---|---|---|---|
| Liquid limit | | 19 | | | | |
| Plasticity index | | 5 | | | | |
| Linear Shrinkage | | 1.5 | (%) | | | |
| 2. Screen analysis: | | | | | | |
| Screen aperture (mm) | 19.0 | 13.2 | 4.75 | 2.0 | 0.425 | 0.075 |
| % pass | 100 | 95 | 61 | 60 | 49 | 13 |
| 3. CBR/UCS Values | | | | | | |
| % Mod AASHTO | 100 | 98 | 97 | 95 | | |
| UCS Value | 59 | 46 | 40 | 31 | | |
| 4. MOD. AASHTO | Units | | | | | |
| Max dry density | | 1985 | (kg/m$^3$) | | | |
| Optimum moisture content | | 9.6 | (%) | | | |
| 5. Classification: | | | | | | |
| Classification System: | | TRB | TRH14 | Unified | | |
| Classification: | | A-1-b(0) | G7 | GM, GC | | |

The effect of organic matter on soil stabilisation was also investigated. For this purpose the organic component of the soil was removed by heating it at 500° C. for 30 minutes followed by thorough washing with water.

Preparation of Stabilised Soil Samples.

The formaldehyde solution was diluted with water before dissolving the urea. The amount of water used was chosen such that the final soil mixture would be at its optimum moisture content (OMC) of 9.5%. The OMC is the moisture content at which the maximum density for a specific material is obtained for a specified compactive effort.

Optimised sample preparation methods were previously reported (Germishuisen, W A, et al., 2001). In a typical procedure, the liquid stabiliser solution was added to approximately 1 kg of the soil and thoroughly mixed to ensure good dispersion in the soil phase. Cylindrical test briquettes were prepared using the Marshall compaction apparatus according to Method 2C, TMH1 (CSRA, 1989). Standard moulds (ID=101.6 mm) were used and compaction was achieved using 50 blows on each side of the sample. The compacted samples were air-dried for a specified number of days. The Indirect Tensile Strength (ITS) was determined using a standard ITS machine. Unless stated otherwise, the ITS dry strengths were determined using samples that were air-dried for either 7 or 21 days. Wet strengths were determined after soaking the air-dried samples in water for 24 hours.

Results and Discussion
Neat Resin Properties

Formaldehyde:urea molar ratios between 1:1 and 2:1 were studied as this is the range applicable for resins used as adhesives and binder compositions (Duvenhage, 1992). During the curing stage, the resins were observed to turn milky before gelling. This is attributed to a phase separation effect: As the cure reaction proceeds, the reaction products become progressively more hydrophobic and less water-soluble (Ebdon, Hunt, and Al-Kinany, 1990; Duvenhage, 1992; Diem and Matthias, 1986 and Meyer, 1979) Above pH=6.3 only a white precipitate formed in the solution and it failed to gel. The resinous reaction products formed below this pH were homogeneous, hard and brittle. With addition of bitumen the products obtained at pH=4 or 5 were generally softer and still homogeneous.

Figure 1:
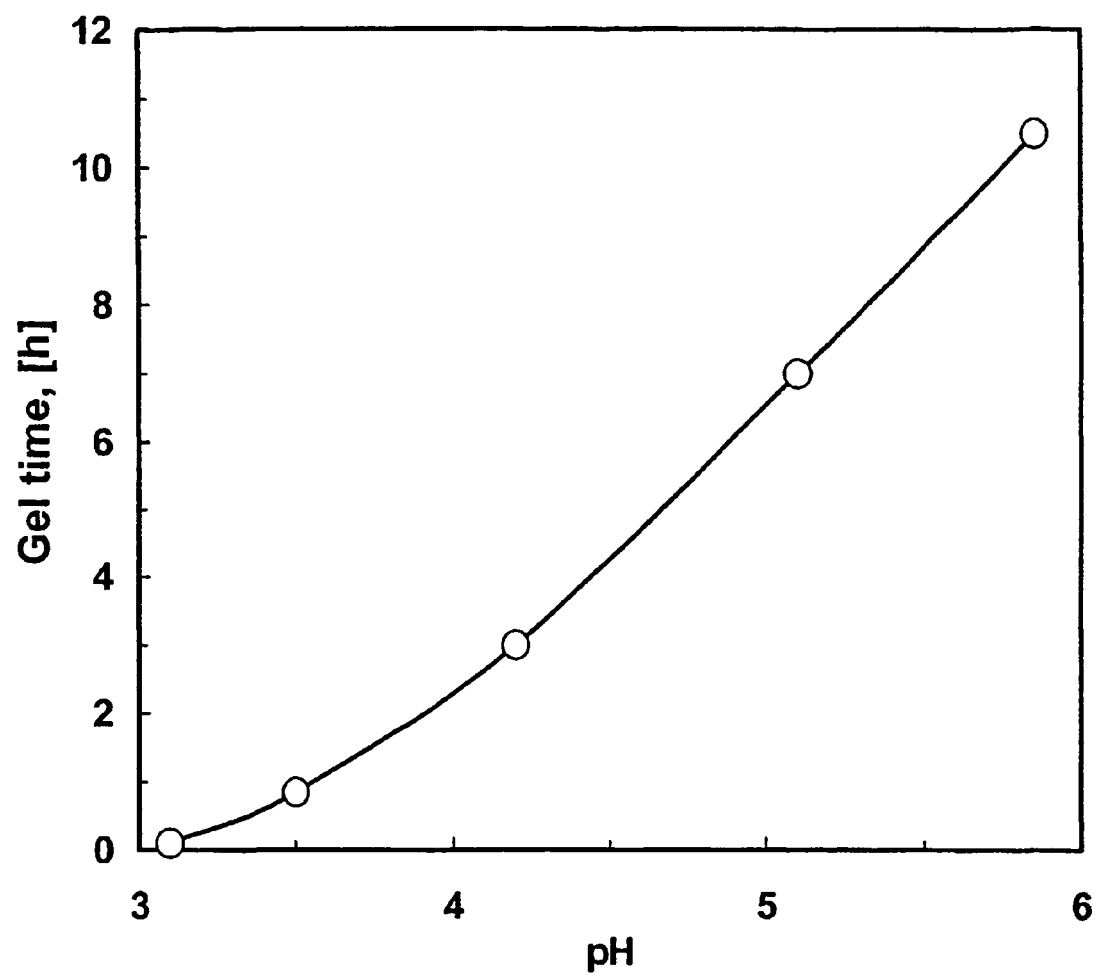
FIG. 1 shows the effect initial resin pH has on gel time at 25° C. for a resin with a formaldehyde: urea molar ratio of 1.25:1.
Figure 2:
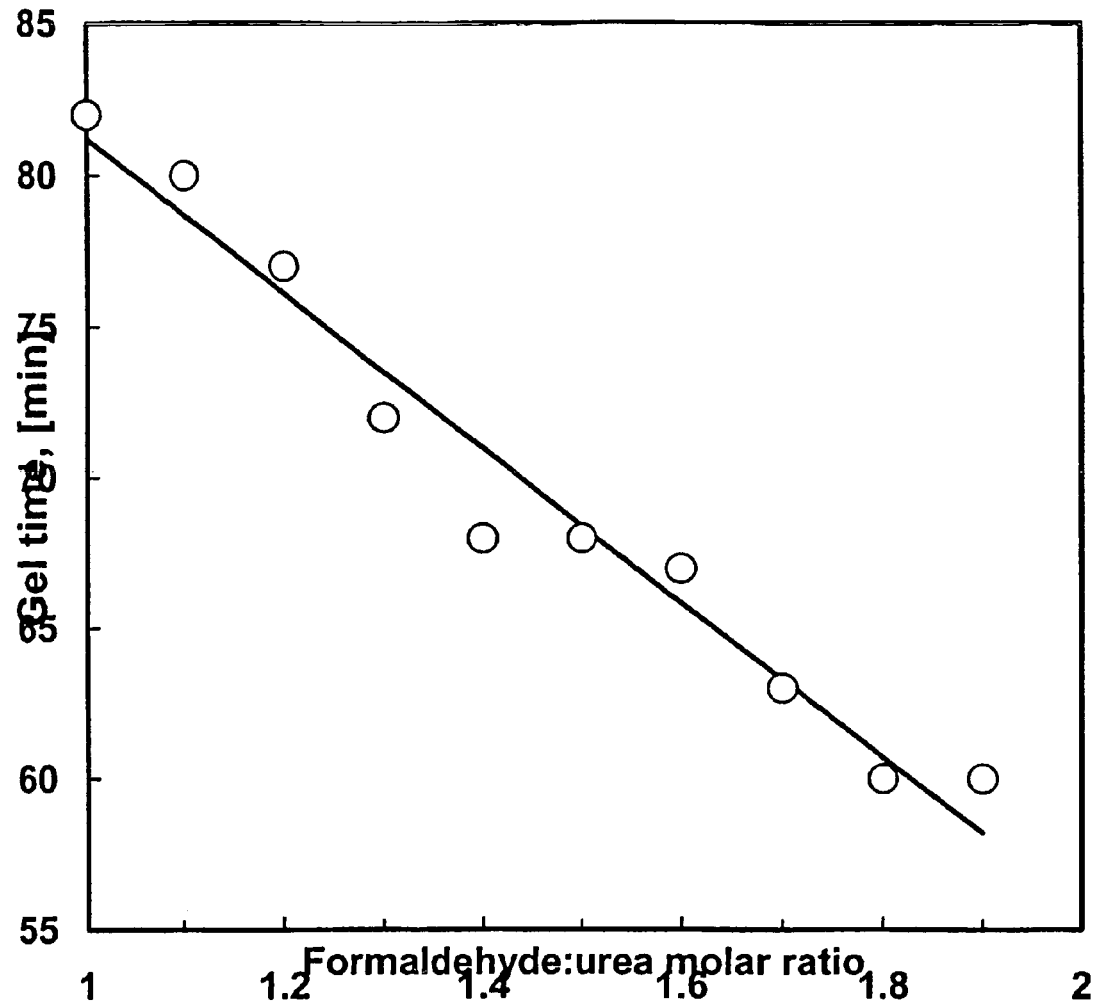
FIG. 2 shows the influence of the formaldehyde:urea molar ratio on the resin gel time at a temperature of 25° C. and pH=3.9.

The gel time of the resin gives an indication of pot life and the time available for application. It was therefore decided to measure the gel time for the neat resin as this was expected to provide conservative estimates. The pH was varied from 3 to 8 and temperature from 13° C. to 34° C. FIG. 1 shows that the gel times increased with cure pH. FIG. 2 suggest a linear decrease in gel time with the molar ratio at a constant cure pH of 3.9. The temperature dependence followed the expected Arrhenius temperature dependence (Duvenhage, 1992; Diem and Matthias, 1986 and Meyer, 1979). For a cure pH of 4.0 at a formaldehyde:urea molar ratio of 1.25:1 the data correlates according to:

$$t_{gel} = 2,89 \times 10^{-5} \exp\left(\frac{47640}{RT}\right)$$

Where $t_{gel}$ is the gel time in seconds, T the temperature in Kelvin and R is the gas constant (8.314 J/(mol.K)).

Figure 3:
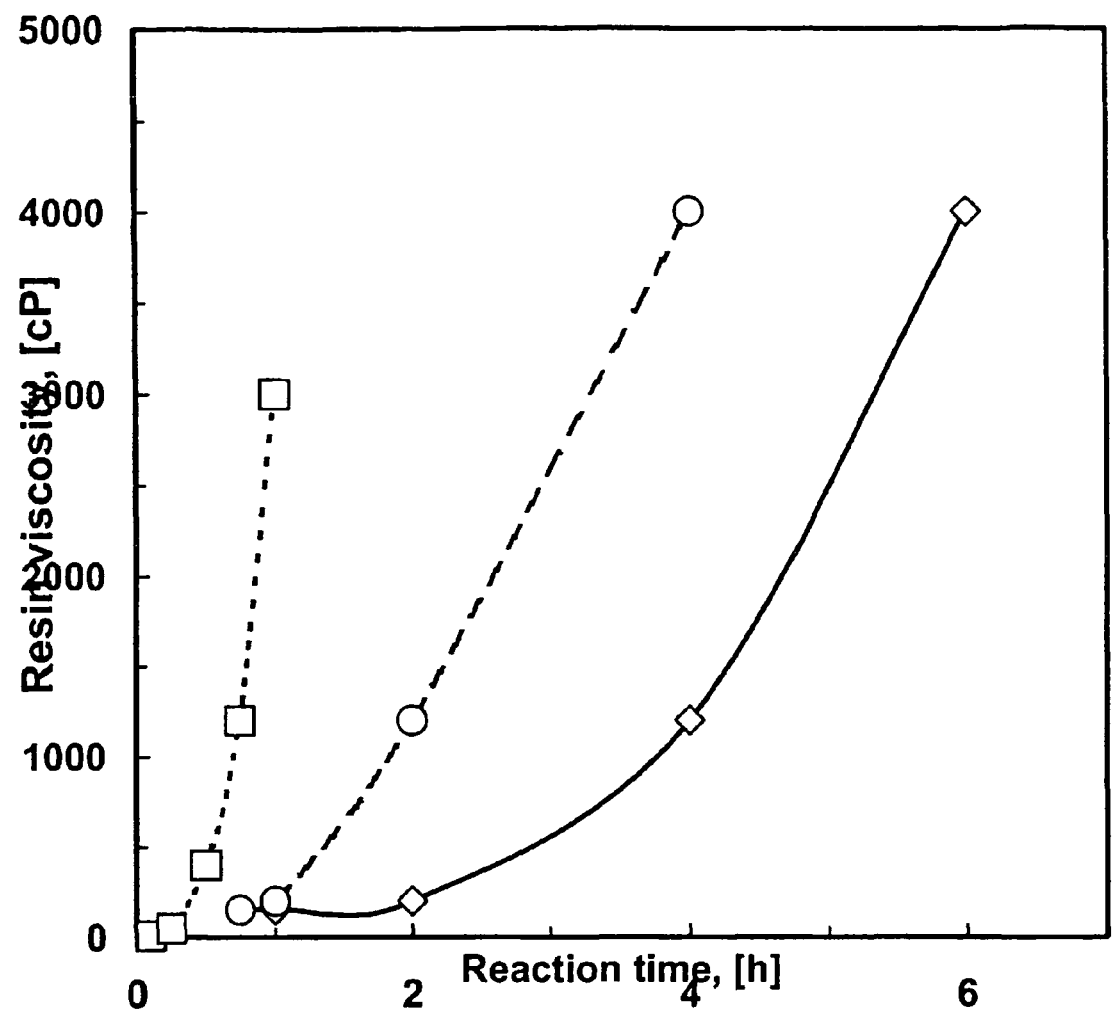
FIG. 3 shows the influence of pH and anionic bitumen addition on the viscosity of the resin during curing at a temperature of 25° C., the formaldehyde:urea molar ratio was 1.23:1 and the bitumen emulsion was SS60 added at a 1:1 mass ratio.

Addition of bitumen emulsion had only a minor effect on gel times. FIG. 3 shows the effect of pH and addition of the anionic bitumen emulsion on the change in resin viscosity. It is clear that it has an accelerating action on the cure rate.

Factors Influencing Soil Stabilisation

It was anticipated that the cure reactions would be modified in the presence of the soil. It was therefore decided to investigate the influence of the reaction parameters indirectly by evaluating their effect on the soil stabilisation efficiency. Unless a parameter was varied in the experiment, the following conditions were kept: 2% each of resin and anionic bitumen emulsion; initial resin pH=4.5; formaldehyde:urea molar ratio=1.5:1 and an air-drying time of 21 days.

Stoichiometry and Initial Resin pH

FIG. 4 shows that the dry soil strength increased with decreasing initial resin pH. Since one hour is a reasonable time for the proper application of soil stabilisers, pH=4.5 was chosen as the lowest viable value. FIG. 5 shows the highest strengths were obtained at formaldehyde to urea molar ratio of 2:1. However, high free formaldehyde content is not desirable from an application point of view. It was therefore decided to maintain the 1.5:1 ratio for practical purposes.

Stabiliser Dosage Level and the Type of Bitumen Emulsion

The effect of the type of bitumen was determined using 2% dosage together with 2% resin. Only the anionic bitumen emulsion showed an improvement in both dry and wet strength. While the improvement in dry strength was marginal, it was significant for the wet strength.

FIGS. 6 and 7 show the effect of stabiliser binder composition on soil stabilisation. In FIG. 6 the bitumen emulsion dosage was kept constant at 2% and the resin level varied. At low resin dosage levels wet strength was reduced. With further resin addition, the ITS recovers and reaches a plateau level above a resin level of 2%. Results obtained for varying the bitumen content with the resin concentration fixed at 2% show that the main effect of bitumen is to increase the wet strength of the stabilised soil (FIG. 7).

Soil Moisture Content

The effect of moisture content on soil strength was studied by varying either drying time or water soak time. Three different series of experiments were conducted with drying time varied up to sixty days and soak time for up to two days. In all cases the soil was stabilised by adding 2% binder composition and 2% bitumen emulsion. One set of the samples were simply allowed to air-dry. For another set, sealing the samples in thin polyethylene bags reduced the rate of moisture loss. In a final series of experiments, fully dried samples, were soaked in water for up to 48 hours.

FIG. 8 shows that the data for all experiments fall on the same curve when plotted against the moisture content of the soil. It shows that full strength development requires a reduction of soil moisture content to below ca. 3%. It also implies a reversible variation in soil strength with moisture content Synthesis of Formose and Organic Soil Components A formose solution was prepared by condensing a formaldehyde solution in an alkaline medium (Weiss, Socha et al., 1980). 100 g water was added to 100 g of a 37% formaldehyde solution and heated to boiling point. 1 g of $Ca(OH)_2$ was added to the boiling mixture every 15 to 20 minutes until a total of 9 g was added. The reaction mixture turned dark brown after 2.5 hours. After 6 hours the mixture was allowed to cool to room temperature. With the naturally occurring organic substances present, addition of the synthetic organic substances offered no further strength improvement. FIG. 9 shows the effect of adding formose to washed soil and sand stabilised with binder composition. When the soil was stripped of its natural organic content it also lost its natural cohesion. In addition, urea-formaldehyde resin without added organic content had no stabilising effect on the clean soil. However, when formose was added, the stabilising efficiency of the resin improved dramatically. The formose itself had some stabilising qualities, but only at higher concentrations.

Comments

Although bitumen emulsion is widely used in road construction and maintenance as binding and waterproofing agents, the large, positive interaction between the resin and the bitumen was not anticipated.

Conclusions

Indirect tensile strength measurements were used to determine the soil stabilisation efficiency of a urea-formaldehyde resin in brown shale gravel. It was found that a combination of urea-formaldehyde resin with an anionic bitumen emulsion improved soil strength by up to a factor of 3. Various system parameters were varied and the following is concluded with respect to soil strength development, but it will be appreciated that there are a great number of variables, which could influence the below values:

- An optimum value is reached at formaldehyde to urea molar ratio of 2:1. However, owing to the problems posed free formaldehyde during stabiliser application, a lower value such as 1.83:1 is recommended;
- Strength increases with decreasing cure pH but it is impractical to use a pH below 4.5 as the time available to work the soil becomes too short;
- At 2% bitumen emulsion dosage, strength development levels off above 2% resin addition;
- At 2% urea-formaldehyde resin dosage level, wet strength levels off above 3% bitumen emulsion;
- The soil organic content is a very important parameter in determining the stabilisation efficiency of urea-formaldehyde resin. Formose can be used with benefit if the soil is deficient in natural organics.

Example 12

Figure 10:
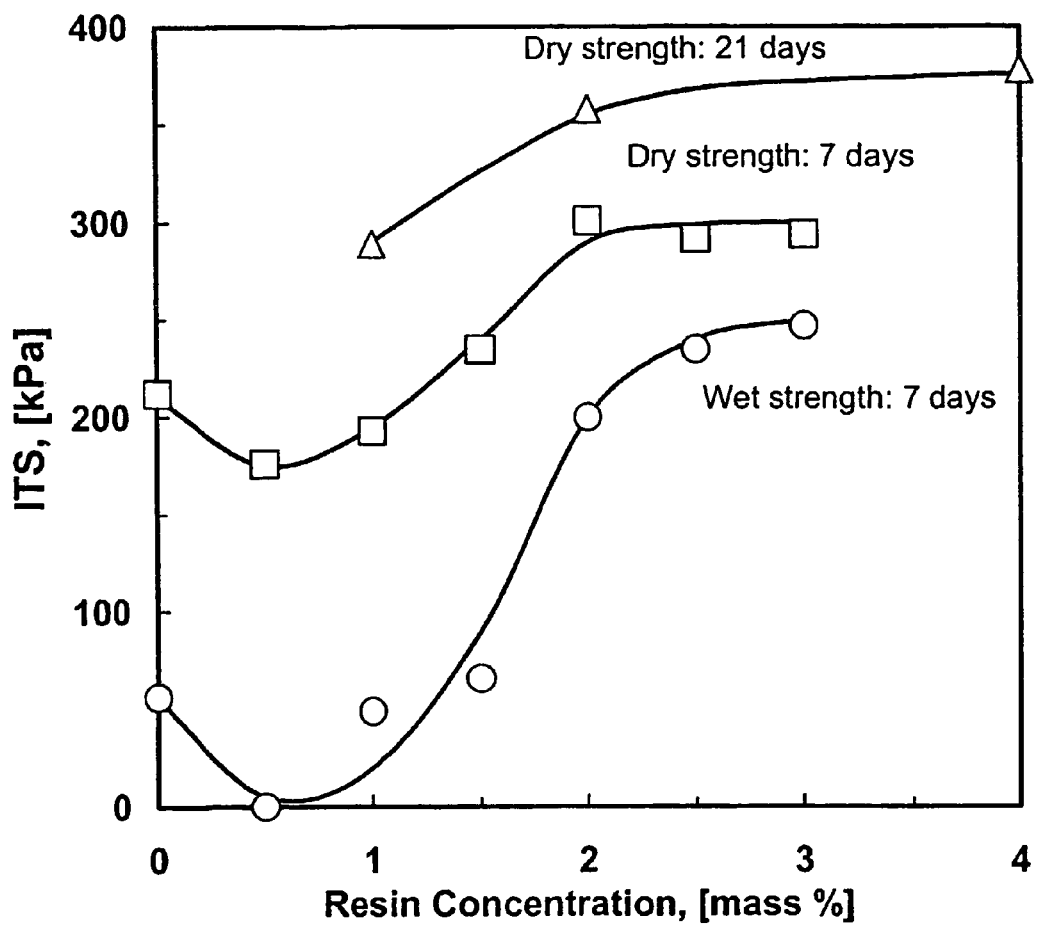
Figure 11:
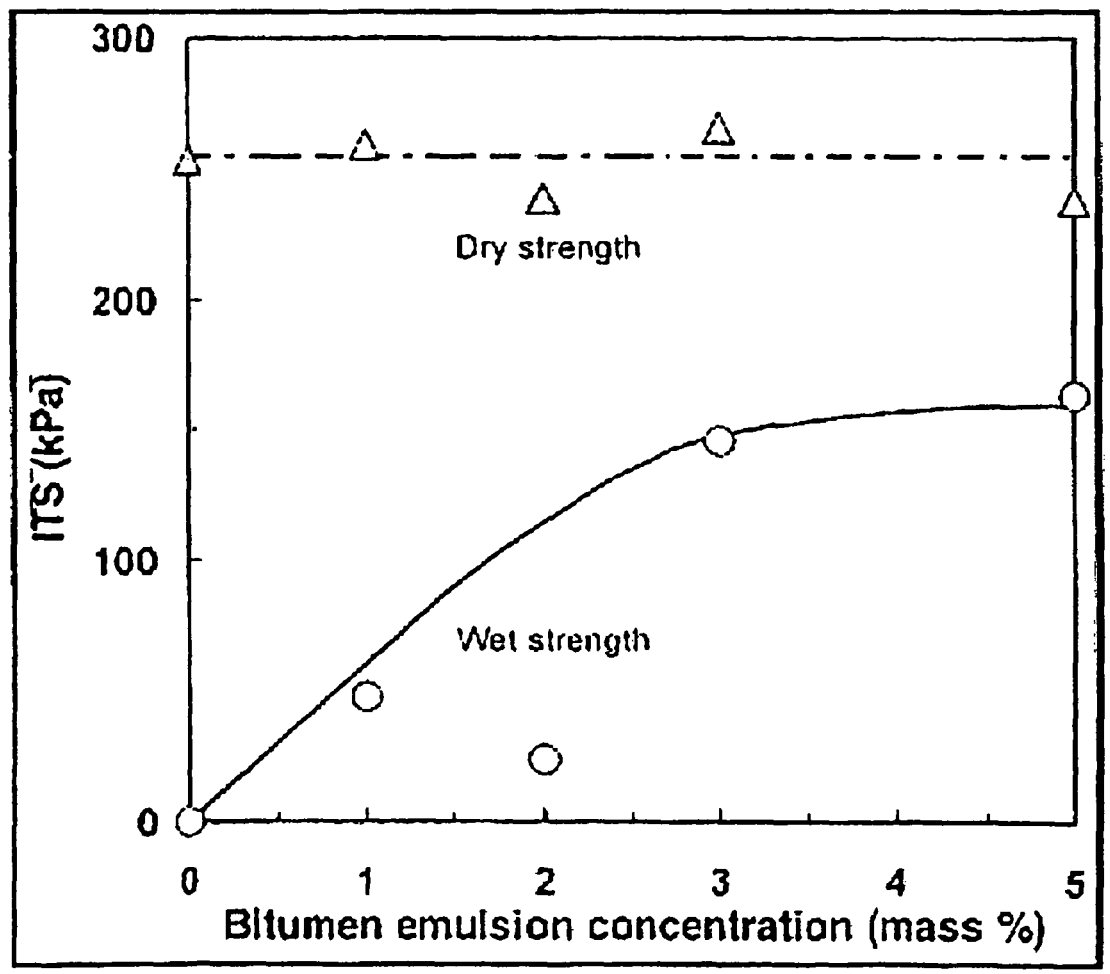
Figure 12:
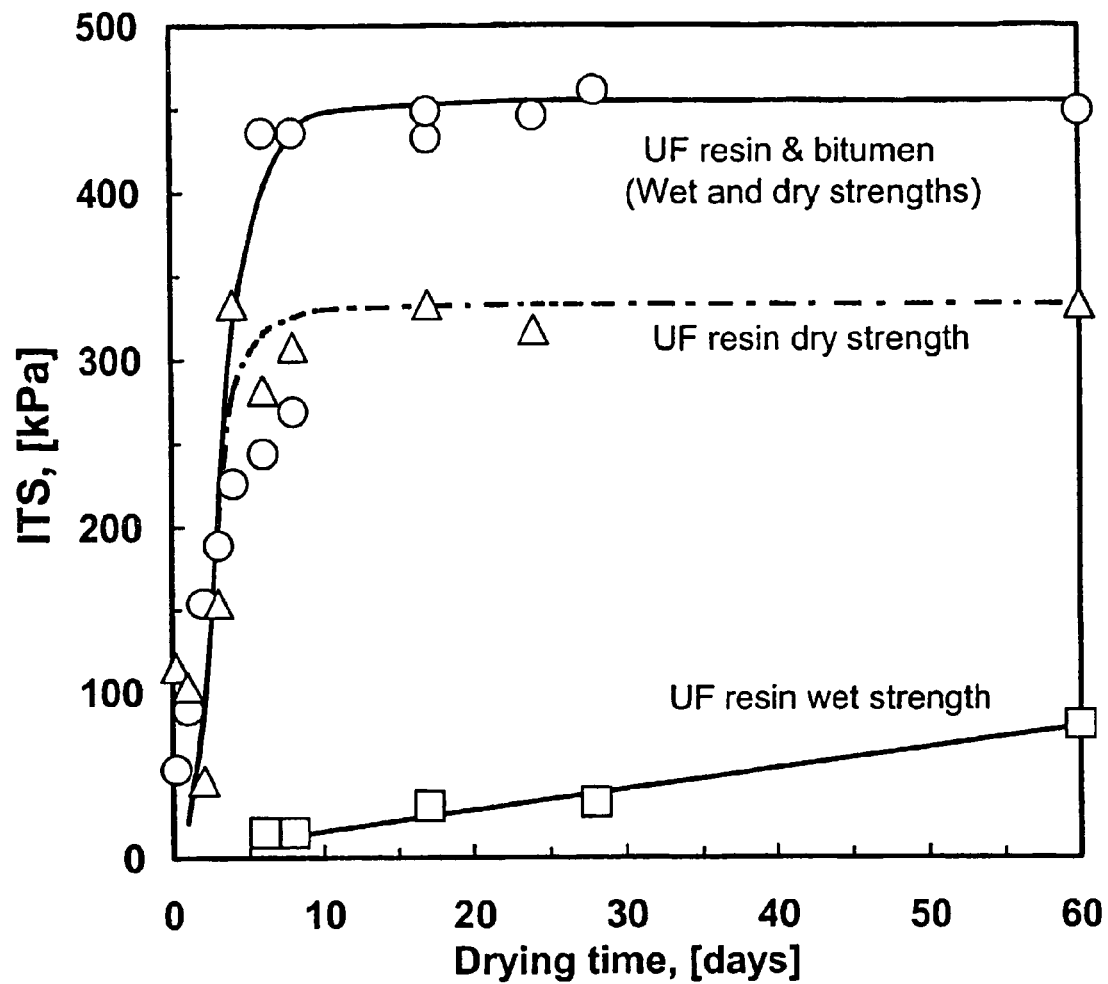
Figure 13:
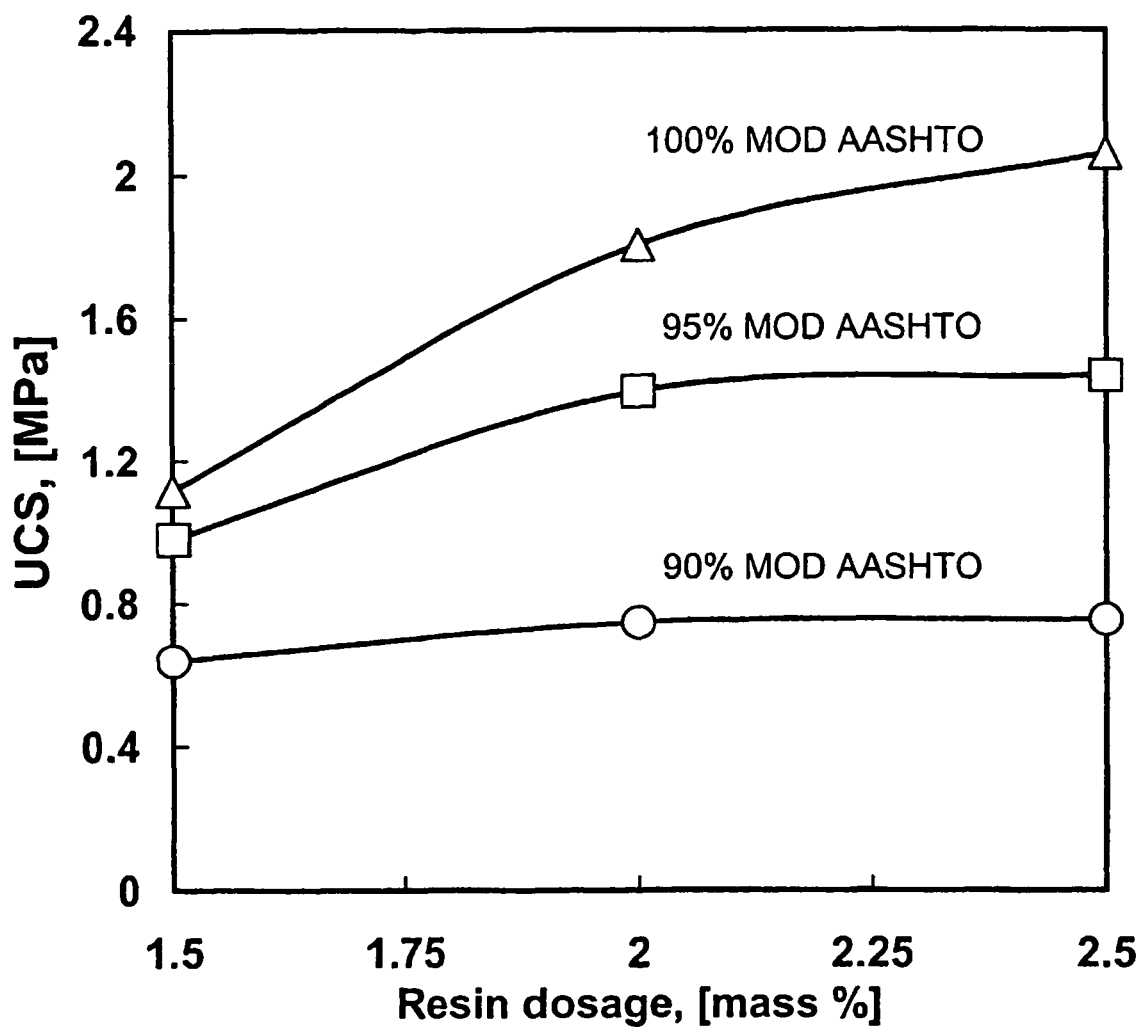
Figure 14:
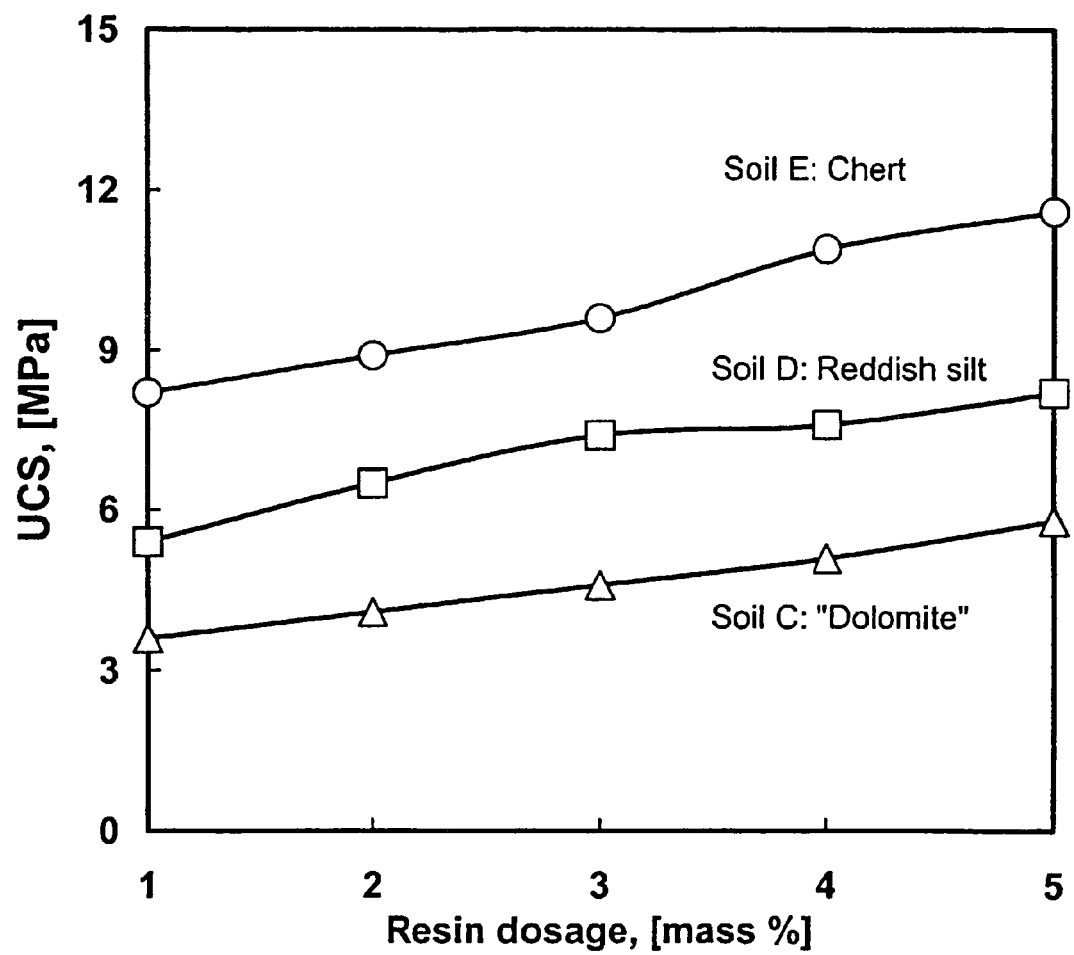
Figure 15:
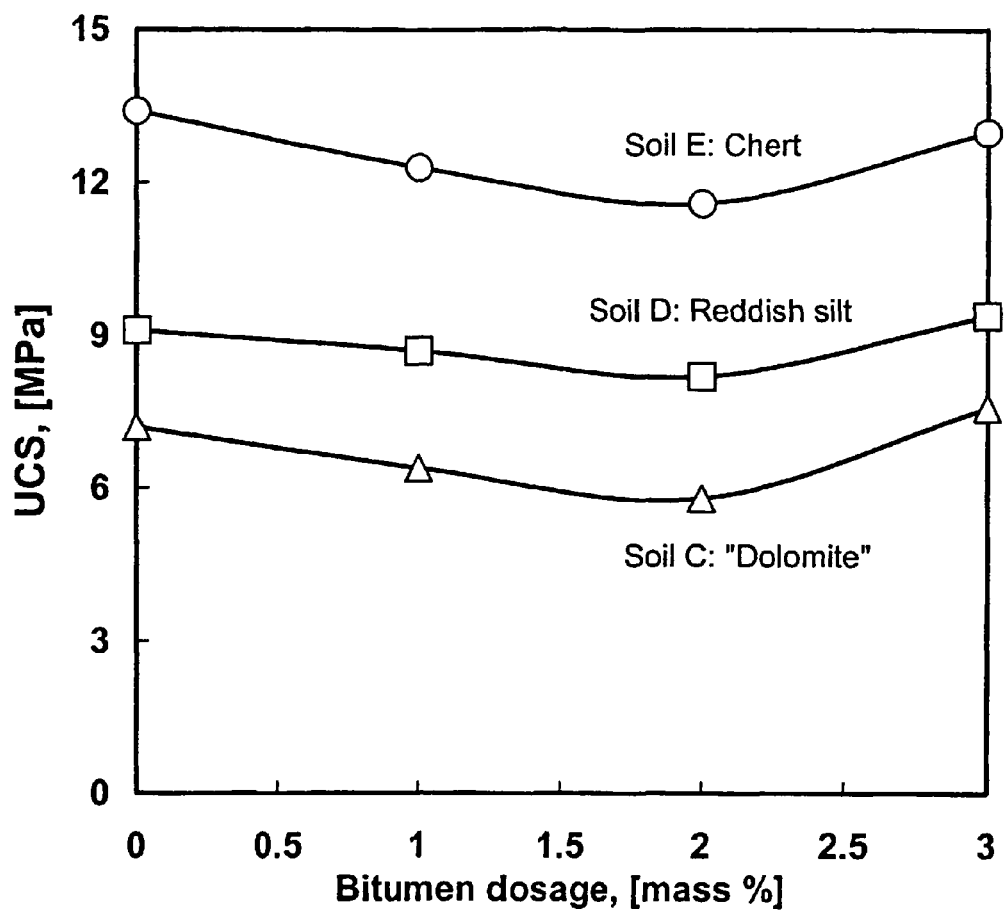

This Example makes reference to the following enclosed drawings wherein:

FIG. 10 shows the effect of resin concentration on strength development of brown shale gravel containing 2% bitumen emulsion;

FIG. 11 shows the effect of the bitumen emulsion dosage on the strength of a brown shale gravel after drying for 7 days, the resin dosage was kept constant at 2%;

FIG. 12 shows the effect of the drying time on the strength of brown shale gravel stabilised with 2% binder composition with and without 2% bitumen emulsion;

FIG. 13 shows the effect of compaction and binder composition dosage on the 21-day dry strength of a calcrete, the resin was used in combination with 2% bitumen emulsion;

FIG. 14 shows the effect of resin dosage on the 21-day dry strength of soils compacted to 100% of Mod AASHTO, the resin was used in combination with 2% bitumen emulsion; and FIG. 15 shows the effect of bitumen emulsion dosage on the dry strength of soil samples (C, D, E) compacted to 100% of Mod AASHTO and dried for 21 days. The bitumen emulsion was used in combination with 5% binder composition.

Factors that influence the effectiveness of a soil stabiliser include the following:

The soil. The type, binder composition, pH and grading of the soil affect its properties and hence influence the performance of the stabiliser (Road Research Laboratory, 1952). The soil moisture content has a direct effect on strength but can also have an effect on the stabilising agent.

The stabiliser. The dosage levels and the use of modifying agents must be optimised.

The application method. Proper mixing is necessary to ensure homogeneous dispersion of the stabiliser in the soil. Ultimate strength is also highly dependent on the degree of compaction that is achieved. The time allowed between application and compaction and between compaction and trafficking also affects performance.

The aim of this Example was to assess the technical suitability of a proprietary, cold-setting urea-formaldehyde (UF) resin as a soil stabiliser for various soils. The indirect tensile strength (ITS) was used as a measure of soil stabilisation efficiency in a brown shale gravel (soil A) for resin optimisation studies. Thereafter the unconfined compression strength (UCS) was used to confirm the results on additional soil samples that included calcaraceous and siliceous particulate materials. The resin was evaluated in combination with other additives such as cement, lime and bitumen emulsion. The effect of factors such as stabiliser dosage level and soil moisture content on stabilisation performance was evaluated.

Experimental Procedure

Materials and Conditioning.

The stabiliser tested in this study was a urea-formaldehyde resin formulation. It was used in combination with a 60% anionic bitumen emulsion to SABS 309. The properties of the test soils are presented in the Table 2. Soil A, a brown shale gravel, was used for initial resin optimisation experiments. It was classified as a G7 material according to the grading, Atterberg limits and CBR in terms of TRH 14 (1985). The moisture content of the soils was maintained by storing them in sealed plastic bags. All the experiments were carried out at a constant temperature of 23° C. The dosage levels of resin and bitumen emulsion are reported on an add-on basis, i.e. the mass of the corresponding undiluted liquid used as a percentage of the dry soil mass.

TABLE 2

Test soil properties

| Material* | | Soil A | Soil B | Soil C | Soil D | Soil E |
|---|---|---|---|---|---|---|
| Screen Analysis | % pass | | | | | |
| | 37.5 mm | 100 | 100 | 100 | 100 | 100 |
| | 26.5 mm | 100 | 100 | 95 | 95 | 100 |
| | 19.0 mm | 100 | 100 | 88 | 89 | 96 |
| | 13.2 mm | 95 | 85 | 85 | 85 | 95 |
| | 4.75 mm | 61 | 76 | 78 | 81 | 89 |
| | 2.0 mm | 60 | 55 | 75 | 74 | 80 |
| | 0.425 mm | 49 | 39 | 67 | 56 | 65 |
| | 0.075 mm | 13 | 15 | 44 | 39 | 39 |
| Constants | Units | | | | | |
| Liquid limit | | 19 | | 37 | 26 | 24 |
| Plasticity Index | | 5 | | 18 | 9 | 9 |
| Linear Shrinkage | % | 1.5 | 9.3 | 4 | 4 | |
| Classification-TRB | | A-1-b(0) | | A-4(3) | A-4(0) | A-(0) |
| Classification-TRH14 | | G7 | G7 | G7 | G7 | G7 |
| Classification-Unified | | GM, GC | — | GC | SC | SC |
| Mod AASHTO | Units | | | | | |
| Max dry density | kg/m³ | 1985 | 2169 | | | |
| Optimum moisture content | % | 9.6 | 7.2 | | | |
| CBR/UCS values | | | | | | |
| 100% Mod AASHTO | | 59 | | | | |
| 98% Mod AASHTO | | 46 | | | | |
| 97% Mod AASHTO | | 40 | | | | |
| 95% Mod AASHTO | | 31 | | | | |

*Soil Descriptions: Soil A: Dark brown shale with a quantity of sand stone and fine gravel; Soil B: Orange calcrete; Soil C: 'Dolomite' (dark brown silty soil); Soil D: Reddish silty soil; Soil E Chert (dark reddish silty soil).

Sample Preparation.

A typical test sample preparation procedure was as follows. The liquid stabiliser system was diluted with the required amount of water to ensure that the final mixture would be at the optimum moisture content (OMC) for compaction. The diluted resin was then added to approximately 1 kg of soil and mixed thoroughly to ensure good distribution of the reagents throughout the soil phase. Cylindrical test briquettes were prepared using the Marshall apparatus according to TMH 1 Method 2C (CSRA, 1990). Standard moulds with an internal diameter of 101.6 mm were used. Compaction was achieved using 50 blows on each side of the sample. The compacted samples were air-dried for a specified number of days. The Indirect Tensile Strength (ITS) was determined according to TMH1 Method A16T (CSRA, 1990). Unless stated otherwise, the ITS dry strengths were determined using samples that were initially air-dried for either 7 or 21 days. Similarly, the wet strength was determined after soaking the air-dried samples in water for a further 24 hours.

Optimisation of the Sample Preparation Procedure.

The effects of compaction soil moisture content, degree of compaction, drying time and soak time were investigated. The binder composition-bitumen emulsion combination was used throughout with both additives dosed at the 2% level. The compaction soil moisture content was varied from 7.5% to 13.5%.

Experiments with Cement and Lime as Binder Composition.

Soil binding experiments with cement and lime were conducted according to TMH1 Method A13T (CSRA, 1990). Instead of the air-drying, the compacted samples were kept in a high humidity cabinet for seven days to allow for curing. This was followed by 24 hours of air-drying before measuring the dry strength. Wet strength was measured after soaking such samples in water for 24 hours. In all cases the cement used was Portland cement type CEM 1 42.5 to SABS ENV197-1.

Unconfined Compressive Strength (UCS).

Tests on the other soils were carried out using the UCS as a measure of the soil stabilisation efficiency of the binder composition. The samples were all prepared according to TMH1 Method A13T (CSRA, 1990). They were air-dried for 21 days before the UCS was determined according to TMH1 Method A14 (CSRA, 1990). In the case of Soil B the effect of compaction level was evaluated at various resin dosage levels. For all the other soil the samples were compacted to 100% of Modified AASHTO.

Results

Optimisation of Sample Preparation Procedure.

Preliminary experiments showed that both the dry strength and soil density peaked at a compaction moisture content near the OMC value. It was therefore used in all further tests. The results obtained with the compaction experiments showed that the dry strength and sample density stabilised, i.e. remained constant after 50 blows per side had been applied. For samples containing bitumen, long drying times (>21 days) were necessary to reach ultimate strengths. Such long drying times are often unacceptable in practice. It was therefor decided to also evaluate the strength after seven days of drying. TMH1 Method A13T (CSRA, 1990) prescribes a soak time of 1 hour. However, the bitumen emulsion treated samples reduced the water penetration rate to such an extent that it was decided to increase the soak times to 24 hours.

Screening of Stabiliser Systems.

Table 3 shows the effect of the various soil stabilisers on the wet and dry strength of soil A after 7 days of air-drying. The low values for lime suggest that it is not an effective soil stabiliser for this soil. The cement and the binder composition are effective provided the correct sample preparation method is used. The results obtained with the binder composition-bitumen emulsion combination (using TMH 1 Method C2) show synergism, especially with respect to wet strength. It was therefore decided to study this system in more detail.

TABLE 3

Effect of treatments on ITS soil strength (in kPa) after a 7-day air-drying period for the brown shale gravel (soil A).

| Indirect Tensile Strength | TMH1 sample preparation method | | | |
|---|---|---|---|---|
| Measurement: | Method A13T[1] | | Method C2[2] | |
| Treatment (dosage) | Dry | Wet | Dry | Wet |
| None | —[3] | — | 160 | 0 |
| Lime (4%) | 7 | 14 | 41 | ~5 |
| Cement (6%) | 325 | 262 | 68 | 35 |
| Bitumen emulsion (2%) | — | — | 210 | 55 |
| binder composition (2%) | — | — | 300 | 15 |
| binder composition (2%) plus lime (2–6%) | — | — | 100 | 30 |
| binder composition (2%) plus cement (4%) | — | — | 290 | 170 |
| binder composition (2%) plus cement (6%) | 287 | 124 | 334 | 230 |
| binder composition (2%) plus bitumen emulsion (2%) | — | — | 435 | 270 |

Notes:
[1]Compaction 4 hours after mixing of stabiliser, curing in a high humidity cabinet for 7 days.
[2]Compaction immediately after mixing of stabiliser, air-drying for 7 days.
[3]"—" indicates that the measured values were too low to be meaningful.

Similar trends were observed with cement and binder composition samples that were cured for 7 days in a humidity cabinet in accordance with TMH1 Method A13T (CSRA, 1990). With 2% binder composition negligible strength development occurred whereas the dry strength with 6% cement reached 325 kPa. The combination of 2% binder composition with 6% cement resulted in a dry strength of 287 kPa and a wet strength of 124 kPa.

Optimisation of Resin Dosage Level.

FIG. 10 shows the effect of resin dosage level on the soil strength of soil A. The bitumen emulsion dosage kept constant at 2% (mass basis). The results reveal an antagonistic interaction at low resin dosage levels. It is particularly severe in the case of wet strength where mechanical integrity is completely lost at the 0.5% resin dosage level. With further resin addition, the ITS recovers and reaches a plateau level above a resin level of 2 to 3%. FIG. 10 also shows that long drying times are beneficial for strength development.

Optimisation of Bitumen Dosage Level.

The effect of bitumen emulsion dosage was determined at a fixed 2% resin level for soil A. The ITS strengths were measured after a 7-day drying period. FIG. 11 shows that adding the bitumen emulsion improves wet strength.

Drying Time.

The effect of air-drying time was studied using Soil A stabilised using 2% resin with and without an addition of 2% bitumen emulsion. FIG. 12 shows that in the absence of bitumen, the binder composition develops negligible wet strength, even after prolonged drying. Wet strength is improved significantly by adding bitumen. When such binder composition-bitumen emulsion combinations are dried for longer than 6 days, wet and dry strengths become indistinguishable. FIG. 12 also shows prolonged drying (>7 days) is necessary to achieve ultimate strengths. Further measurements revealed that strengths exceeding 400 kPa were only achieved when the residual moisture content of the soil was reduced to below 2.5%.

Compaction.

A calcaraceous particulate material (soil B) was used to study the effect of soil compaction on ultimate unconfined compressive strengths (UCS). It was treated with 2% bitumen and various percentages of resin. The UCS was determined after a 21-day drying time. The results are reported in FIG. 13 and it show that, as usual, proper soil compaction is essential for achieving high UCS values.

Effect of Resin and Bitumen Dosage Levels on the Strength of other Soils.

FIGS. 14 and 15 respectively show the effects of varying either resin or bitumen dosage levels on the compressive strength of three additional test soils: two silty soils (soils C and D) and a chert (soil E). At a constant 2% bitumen emulsion dosage, an increase in resin level leads to a linear increase in compression strength. When the resin level is pegged at 5%, an increase of bitumen dosage initially decreases compression strength. However, when the bitumen level reaches ca. 3%, the initial compression strength is recovered. Comparison of the UCS values for soil B (FIG. 14) in relation to soils C, D and E (FIG. 15) also shows large differences for the same bitumen emulsion content and corresponding resin content. For the one sample of each tested, the performance of the binder composition-bitumen system decreased in the series:

Chert>reddish silt 22 "dolomite">calcrete.

The compression strengths obtained with chert and calcrete differed significantly. This illustrates the important effect of soil type on the performance of specific soil stabilisers (Ingles and Metcalf, 1972).

Discussion

The synergistic interaction between the cement and binder composition might be explained in terms of differences with respect to water requirements during curing. The chemical cure reaction of the binder composition releases water. Removal of the water is necessary in order to drive the reaction to completion. This is confirmed by the observation that full strength development, in binder composition stabilised soil, requires removal of free moisture. In contrast, the curing of cement involves hydration reactions that consume water. These opposing needs might be better satisfied when the two additives are used together in suitable proportions. The cement, by absorbing the excess moisture, causes local dehydration and thereby contributes to more efficient curing of the binder composition. On the other hand, the binder composition cross-linking reaction releases additional water to help cure the cement.

Bitumen emulsions are widely used in road construction and maintenance as a binding and waterproofing agent. It is therefore not surprising that it provided a degree of soil stabilisation by itself. However, the large, positive interaction between the resin and the bitumen, with respect to indirect tensile strengths, was not anticipated. It is not clear what gives rise to this synergistic interaction. It could be related to improved wetting of soil particles, reactions between the resin and bitumen components or even a plasticising effect of the bitumen on the resin.

Early investigations into resin treatment of soils focussed on reducing water absorption (Road Research Laboratory, 1952). However, bacteria and fungi attack most resins and this has limited their application. It is noteworthy that Otake et al (1995) found no evidence of biodegradation of urea-formaldehyde resin buried under soil for over 32 years. This implies that the binder composition has an intrinsic resistance to soil-borne bacteria and fungi. Further work is required to reduce the health hazard associated with the use of urea-formaldehyde resins in open work environments.

Conclusions

Indirect tensile strength measurements on a brown shale gravel (soil A) were used to optimise the application of a proprietary urea-formaldehyde soil stabiliser. Dry strengths were measured on compacted soil samples that were air-dried for either 7 or 21 days. Wet strengths were measured by soaking such samples for at least one hour in water. Comparing the results with the properties of the natural soil, showed that, under these conditions:

Cement and binder composition are effective provided the appropriate soil preparation procedure, as described in Table 3, is used;

2% binder composition addition doubled the soil dry strength;

Addition of 6% cement to the 2% binder composition stabilised system gave a similar dry strength and improved the wet strength considerably; and The highest strengths were obtained with a combination of binder composition (2%) and bitumen emulsion (2%). The 21-day dry strength was almost trebled.

It was found that by using the binder composition for treating particulate material, like soil, the soil is significantly hardened and made water resistant. The soil is therefore turned into a durable building material. The treated soil can be used for roads; structures such as walls, floors, foundations and support structures for buildings; water storage such as ponds, dams, tanks, canals or waterproofing; and for embankments, railway lines, dust control, underground grouting, tunnels, basements, fence posting, pylons, poles, pipes, surface coating, landing strips, sports fields, military applications, waste/pollution control, artificial rocks, statues or decorative features.

It was further found that the present invention differs from the inventions disclosed in D1 and D2 discussed in the introduction hereof as follows:

Inclusion of Sugars

The present invention discloses the addition of sugars to the reaction mixture to enhance the binding properties of the binder composition. This is not disclosed in D1 and D2

Humic and Fulvic Acids

The present invention discloses the addition of humic and fulmic acids to the reaction mixture to act as binding promoters to greatly enhance the binding properties of the binder composition.

This is not disclosed in D1 and D2.

Permeating vs Physical Mixing:

D1 contacts the soil (p 1 line 73 in claim 1), "by pouring or spraying" "to easily permeate into cracks in rocks or into voids in soil" (p 1 line 90, p 2 line 9, p4 line 101, p 6 line 19, p8 line 19).

D2 discloses "injecting a chemical grout" into the soil (p 1 lines 10, 52 and p 2 line 128).

The present invention mixes the particulate material with the binder composition physically/mechanically and then compacts it to form a well mixed unified whole.

Gel or Grout vs Cross-Linked Solids:

D1 and D2 disclose "pours or sprays" on or "injects a grout" to form a gel in soil (D1 p 1 line 13 and D2 p 1 lines 12, 30, 31 and 35).

The present invention causes the chemicals to react from a liquid, through a gel phase to a hard, solid series of cross-linked polymer chains, and not a gel.

Short vs Long Setting Time:

D1 reacts the chemicals into a gel in say 8 seconds or as "short as possible" (p 3 lines 37, 26, 34).

D2 reacts the chemicals into a grout in under 4 minutes "completion of the cure is short" (p 4 table 1).

The present invention takes longer than 30 minutes and preferably days and even weeks to allow cross linking to take place, resulting in a very different, superior result.

Different Molar Ratios/Excess Formaldehyde:

D1 uses 1:1.5 to 1:2.5 urea to formaldehyde, which urea is then increased substantially in (3) i.e. by 3×12 times the weight of the unreacted formaldehyde.

D2 similarly found that results deteriorated with more than 1:1.2 or 1:1.5 ratios.

The present invention includes an important inventive step of excess formaldehyde in a molar ratio exceeding 1:1.5 (u:f) (which allows cross linking over a long period with a weak acid.)

This increases strength substantially more than D1 and D2 and impermeability significantly more than D1.

More Free Formaldehyde in UFC:

D1 discloses and uses 0.2 to 6% of unreacted formaldehyde in the UFC (p 2 line 81).

D2 discloses a pre-reaction process at 70° C. at higher than lower pH which leaves similar low amounts of unreacted formaldehyde.

The present invention specifically uses more than 6% free formaldehyde which, together with a weak (citric) acid catalyst leaves much active, excess formaldehyde to form longer polymer chains and cross linking for days/weeks, which can not happen with no excess formaldehyde or if the reaction is completed in seconds or minutes.

Different Acid Strengths/Reactions:

D1/D2 disclose the conventional strong acids used to complete their reaction within seconds or minutes.

The present invention discloses the use of weak organic acids such as humic, fulmic fulvic, citric and acetic acids to produce a slower reaction over a much longer time (days/weeks). The chemical reaction of citric acid is also different (3-sided rather than 2-sided) which helps multi-dimensional cross linked chains to form.

Bitumen:

The present invention discloses the use of bitumen in the binder composition and this is not disclosed in D1 and D2.

It will be appreciated that variations in detail are possible with a binder composition and method for treating particulate material and a method of preparing the binder composition according to the invention without departing from the scope of the appended claims.

The invention claimed is:

1. A method of preparing a solid aggregate matrix material useful as a road construction material, the method comprising:
   a polar solvent, urea-formaldehyde precondensate, anionic bitumen emulsion, additional urea, and fulvic acid and/or a salt thereof at a temperature of 50° C. or less to form a binder composition;
   mixing the binder composition with soil; and
   allowing the binder composition to set over a period of time of at least 30 minutes to form a solid aggregate matrix, wherein the pH of the binder composition is adjusted to a value from 2.0 to 5.3.

2. A method according to claim 1 wherein the polar solvent is selected from the group consisting of water, alcohol, and mixtures thereof.

3. A method according to claim 1 further comprising mixing in a surfactant prior to the step of setting.

4. A method according to claim 3 wherein the surfactant comprises sodium dodecyl benzene.

5. A method according to claim 1 further comprising the step of adding any one or more agents selected from the group consisting of silicones, silanes, silanoles, oils, anti-corrosion agents, ultraviolet light blocking agents, biocides, pH buffers, cement, ammonia, ammonium salts, plasticisers, ligna sulphinates and oxides thereof, phenols and mixtures thereof, prior to the step of setting.

6. A method according to claim 5 wherein the plasticisers are selected from the group consisting of phthalates, hydrocarbons, acetates, latex and glycols.

7. A method according to claim 5 wherein the ultraviolet light blocking agents are selected from the group consisting of organic phenols, phosphates and inorganic oxides.

8. A method according to claim 1 wherein the formaldehyde:urea molar ratio in the binder composition is between 1.5 and 2.5:1.

9. A method according to claim 8 wherein the formaldehyde:urea molar ratio in the binder composition is 1.83:1.

10. A method according to claim 1 further comprising the step of compacting the aggregate matrix material after the step of mixing and prior to the step of setting.

11. A method according to claim 1 wherein said binder composition is further comprised of a weak organic acid selected from citric acid, acetic acid, and mixtures thereof.

12. A method according to claim 1 further comprising an additional step of adding a sugar prior to the step of setting.

13. A method according to claim 12 wherein the sugar is selected from the group consisting of sucrose, glucose and fructose and mixtures thereof.

14. A method according to claim 1 further comprising mixing in humic acid prior to the step of setting.

15. The method according to claim 1 wherein said anionic bitumen emulsion is included in an amount of up to 5% by weight of said solid aggregate matrix.

16. The method according to claim 1 wherein said fulvic acid is a synthetic fulvic acid.

17. The method according to claim 1 wherein said temperature of 50° C. or less is a temperature of 30° C. or less.

* * * * *